(12) United States Patent
Itano et al.

(10) Patent No.: US 8,848,079 B2
(45) Date of Patent: Sep. 30, 2014

(54) SOLID-STATE IMAGING DEVICE AND IMAGING SYSTEM USING BUFFERED COUNTER VALUE OF A COUNTER

(71) Applicant: Canon Kabushiki Kaisha, Tokyo (JP)

(72) Inventors: Tetsuya Itano, Sagamihara (JP); Hiroki Hiyama, Sagamihara (JP); Kazuhiro Saito, Tokyo (JP); Kohichi Nakamura, Kawasaki (JP); Koichiro Iwata, Kawasaki (JP); Takeshi Akiyama, Kawasaki (JP); Kazuo Yamazaki, Yokohama (JP); Daisuke Yoshida, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 140 days.

(21) Appl. No.: 13/629,332

(22) Filed: Sep. 27, 2012

(65) Prior Publication Data

US 2013/0088628 A1    Apr. 11, 2013

(51) Int. Cl.
*H04N 5/335* (2011.01)
*H04N 3/14* (2006.01)
*H03M 1/00* (2006.01)
*H04N 5/365* (2011.01)

(52) U.S. Cl.
CPC .............. *H04N 5/578* (2013.01); *H04N 5/3658* (2013.01)
USPC .......................................... 348/302; 341/126

(58) Field of Classification Search
None
See application file for complete search history.

(56) References Cited

U.S. PATENT DOCUMENTS

| | | | |
|---|---|---|---|
| 2013/0016260 A1* | 1/2013 | Maruta et al. ................. | 348/294 |
| 2013/0062503 A1* | 3/2013 | Saito et al. .................. | 250/208.1 |
| 2013/0070136 A1* | 3/2013 | Hiyama et al. ................ | 348/300 |
| 2013/0087686 A1* | 4/2013 | Itano et al. .................. | 250/208.1 |
| 2013/0087688 A1* | 4/2013 | Saito et al. .................. | 250/208.1 |
| 2013/0088292 A1* | 4/2013 | Maehashi et al. ......... | 330/124 R |
| 2013/0088627 A1* | 4/2013 | Nakamura et al. ............ | 348/302 |

FOREIGN PATENT DOCUMENTS

JP    2009-60327 A    3/2009

* cited by examiner

*Primary Examiner* — Sinh Tran
*Assistant Examiner* — Shahbaz Nazrul
(74) *Attorney, Agent, or Firm* — Canon USA, Inc. IP Division

(57) ABSTRACT

A solid-state imaging device includes a plurality of pixels arranged in a matrix, a plurality of readout circuits provided in each column of the plurality of pixels arranged in a matrix, configured to read out for each column a signal of the plurality of pixels, a plurality of comparison units configured to compare a signal output from the plurality of readout circuits with a reference signal whose level changes with time, a counter configured to perform a count operation from when the level of the reference signal starts to change, first and second buffers each configured to buffer a count value of the counter, and a plurality of storing units connected to the plurality of comparison units, configured to store a count value of the counter when a magnitude relation between a signal output from the plurality of the readout circuits and the reference signal is inverted.

11 Claims, 18 Drawing Sheets

SOLID-STATE IMAGING DEVICE AND IMAGING SYSTEM USING BUFFERED COUNTER VALUE OF A COUNTER

BACKGROUND OF THE INVENTION

1. Field of the Invention

One disclosed aspect of the embodiments relates to a solid-state imaging device used in a scanner, a video camera, or a digital still camera.

2. Description of the Related Art

Recently, a complementary metal oxide semiconductor (CMOS) image sensor has been widely used in a digital camera, a digital video camera, or a camera unit in a cellular phone. Further, a CMOS image sensor which includes an analog-digital (AD) conversion circuit is in development in response to a demand to reduce the number of components and power consumption. An example of such a CMOS image sensor employs a column AD conversion circuit (ADC) technique in which an ADC is arranged in each column of a pixel array. A column ADC based on ramp architecture is a well-known type of the A/D conversion method used in the column ADC.

The column ADC based on ramp architecture includes a comparator and a ramp signal source arranged in each column. The comparator compares a ramp signal, i.e., a reference signal, with a pixel signal, and measures the time required for a magnitude relation between a potential of the pixel signal and a potential of the ramp signal to be inverted. The comparator then stores the measured time as digital data in a column memory arranged in each column. For example, Japanese Patent Application Laid-Open No. 2009-60327 discusses a method which uses one counter, i.e., a common counter, that counts the reference signal (i.e., a slope signal) and the time from when a voltage of the reference signal starts to change from an initial voltage.

Japanese Patent Application Laid-Open No. 2009-60327 discusses a solid-state imaging device employing the column ADC based on ramp architecture. In the solid-state imaging device, the counter starts counting, with respect to the voltage of when the pixel has been reset, from the time the reference signal has started to change to the time when a comparison result signal has become inverted. The solid-state imaging device then stores in a storing unit (i.e., the N memory) a count value which the counter has counted. The counter then starts counting, for a signal reading voltage of when the pixel has not been reset, from the time the reference signal has started to change to the time when a comparison result signal has become inverted. The solid-state imaging device then stores in a storing unit (i.e., the S memory) a count value which the counter has counted.

A subsequent circuit performs digital correlated double sampling (CDS) processing in which a difference between the count values in the N memory and the S memory is acquired, and a signal component of the pixel is extracted. A count pulse (i.e., the count value) supplied from the counter is then sequentially propagated to the storing unit from the side closer to the counter. In such a method, if propagation delay of the count pulse supplied from the counter to the N memory in a column is different from the propagation delay of the count pulse supplied from the counter to the S memory in the same column, the following problem occurs.

For example, if images are captured in a dark state, the voltage when the pixel is reset is the same as the signal readout voltage when the pixel is not reset. The count values stored in the N memory and the S memory thus become the same. As a result, the signal component of the pixel extracted by the digital CDS processing becomes 0.

However, the propagation delay of the count pulse supplied from the counter to the N memory in a column may be different from the propagation delay of the count pulse supplied from the counter to the S memory in the same column. In such a case, the count values stored in the N memory and the S memory do not become the same, and the extracted signal component includes an offset, and does not become 0. The offset becomes a fixed noise component in each column and thus causes image deterioration.

SUMMARY OF THE INVENTION

One disclosed aspect of the embodiments is directed to providing a solid-state imaging device which is capable of reducing the fixed noise component in each column caused by the difference in the propagation delays of the count values. One disclosed feature of the embodiments may be described as a process which is usually depicted as a timing diagram. A timing diagram may illustrate the timing relationships of several entities, such as signals, events, etc. Although a timing diagram may describe the operations as a sequential process, some operations may be performed in parallel or concurrently. In addition, unless specifically stated, the order of the operations or timing instants may be re-arranged. Furthermore, the timing or temporal distances may not be scaled or depict the timing relationships in exact proportions.

According to an aspect of the embodiments, a solid-state imaging device includes a plurality of pixels arranged in a matrix, each of the plurality of pixels configured to generate a signal by photoelectric conversion, a plurality of readout circuits provided in each column of the plurality of pixels arranged in a matrix, configured to read out for each column a signal of the plurality of pixels, a plurality of comparison units configured to compare a signal output from the plurality of readout circuits with a reference signal whose level changes with time, a counter configured to perform count operation from when the level of the reference signal starts to change, a first buffer configured to buffer a count value of the counter, a second buffer configured to buffer a count value of the counter, and a plurality of storing units connected to the plurality of comparison units, configured to store a count value of the counter when a magnitude relation between a signal output from the plurality of the readout circuits and the reference signal is inverted, wherein each of the plurality of storing units includes a first storing unit to which an output signal from the first buffer is input, configured to store the count value of a signal output from the readout circuit when the pixel is in a reset state, and a second storing unit to which an output signal from the second buffer is input, configured to store the count value of a signal output from the readout circuit when the pixel is in a non-reset state.

According to an exemplary embodiment, the solid-state imaging device including the first buffer and the second buffer is capable of reducing the fixed noise component in each column caused by the difference in the propagation delays of the count values.

Further features and aspects of the disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the disclosure.

DESCRIPTION OF THE EMBODIMENTS

Various exemplary embodiments, features, and aspects of the disclosure will be described in detail below with reference to the drawings.

Figure 1:
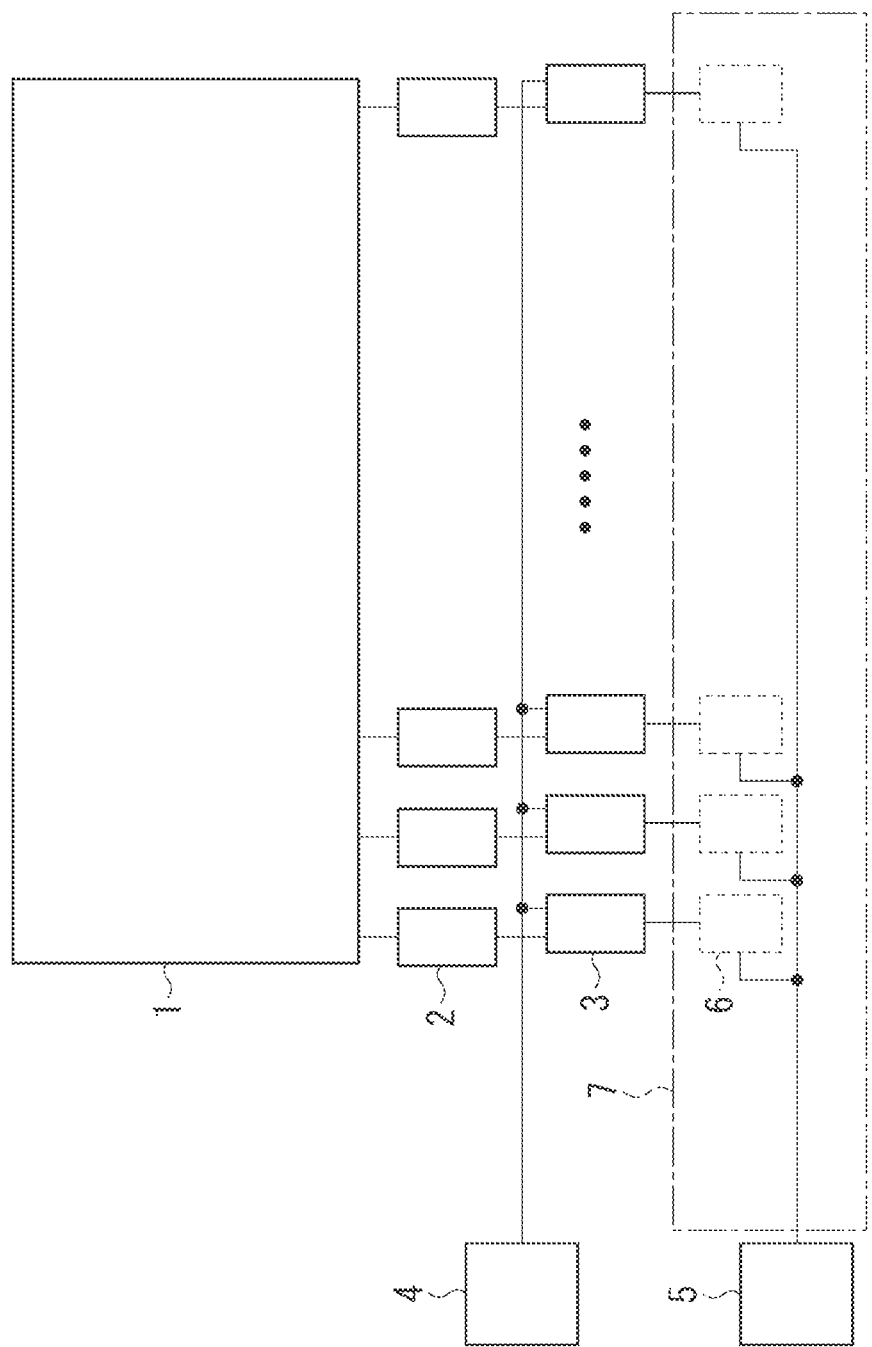
FIG. 1 illustrates a configuration example of a solid-state imaging device according to a first exemplary embodiment.

The first exemplary embodiment will be described below. FIG. 1 illustrates a configuration example of the solid-state imaging device according to the first exemplary embodiment. Referring to FIG. 1, the solid-state imaging device includes a pixel unit 1, a readout circuit 2, a comparison unit 3, a storing unit 6, a reference signal generation unit 4 which generates the reference signal, a counter 5, a horizontal scanning circuit, and a signal processing circuit. The readout circuit 2, the comparison unit 3, and the storing unit 6 are arranged in each column. The horizontal scanning circuit and the signal processing circuit will be described below with reference to FIG. 7.

Figure 7:
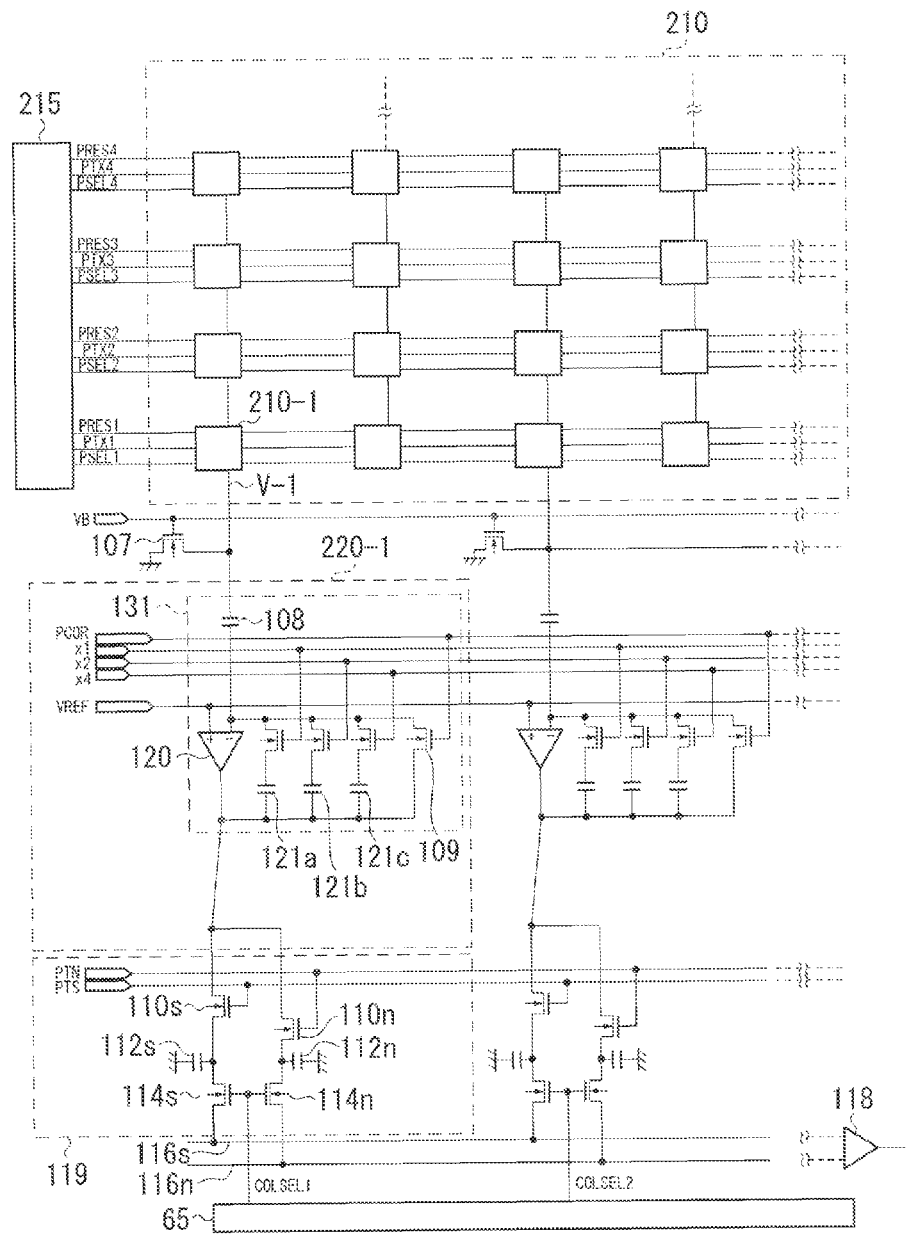
FIG. 7 illustrates a configuration example of the solid-state imaging device.

The pixel unit 1 includes a plurality of pixels 210-1 arranged in a matrix, similarly as a pixel unit 210 illustrated in FIG. 7. The plurality of pixels 210-1 generates a signal by performing photoelectric conversion. The plurality of readout circuits 2 is arranged in each column of the plurality of pixels 210-1 arranged in a matrix and reads out for each column the signal generated by the plurality of pixels 210-1. The plurality of comparison units 3 which is connected to the plurality of readout circuits 2 compares the signal output from the plurality of readout circuits 2 and the reference signal generated by the reference signal generation unit 4. The level of the reference signal changes with time. The counter 5 counts the time from when the level of the reference signal, generated by the reference signal generation unit 4, starts to change. The plurality of storing units 6 is connected to the plurality of comparison units 3. Further, the plurality of storing units 6 stores the count value of the counter 5 when the magnitude relation between the signal output from the plurality of readout circuits 2 and the reference signal generated by the reference signal generation unit 4 becomes inverted. A storing section 7 includes the plurality of storing units 6.

The configuration example and the operation of the solid-state imaging device not including the A/D conversion unit will be described below to simplify the description of the present exemplary embodiment. FIG. 7 illustrates an exemplary configuration of the pixel unit 210 and the readout circuit arranged below the pixel unit 210 in the solid-state imaging device. The comparison unit 3, the reference signal generation unit 4, the counter 5, and the storing section 7 illustrated in FIG. 1 are omitted in FIG. 7. In contrast, the configuration illustrated in FIG. 1 does not include a CDS circuit 119 and a differential processing unit 118. The CDS circuit 119 is arranged subsequent to an amplifier circuit 220-1.

The pixel unit 210 includes the plurality of pixels 210-1 configured with a plurality of columns and rows. Referring to FIG. 7, the signal output from the pixel in the odd-number column counting from the left side is read out by the readout circuit arranged below the pixel unit 210. On the other hand, the signal output from the pixel in the even-number column counting from the left side is read out by the readout circuit (not illustrated) arranged above the pixel unit 210. The readout circuits are thus alternately-arranged so that the readout circuits are laid out within an area corresponding to two columns of the pixel unit 210.

Figure 8:
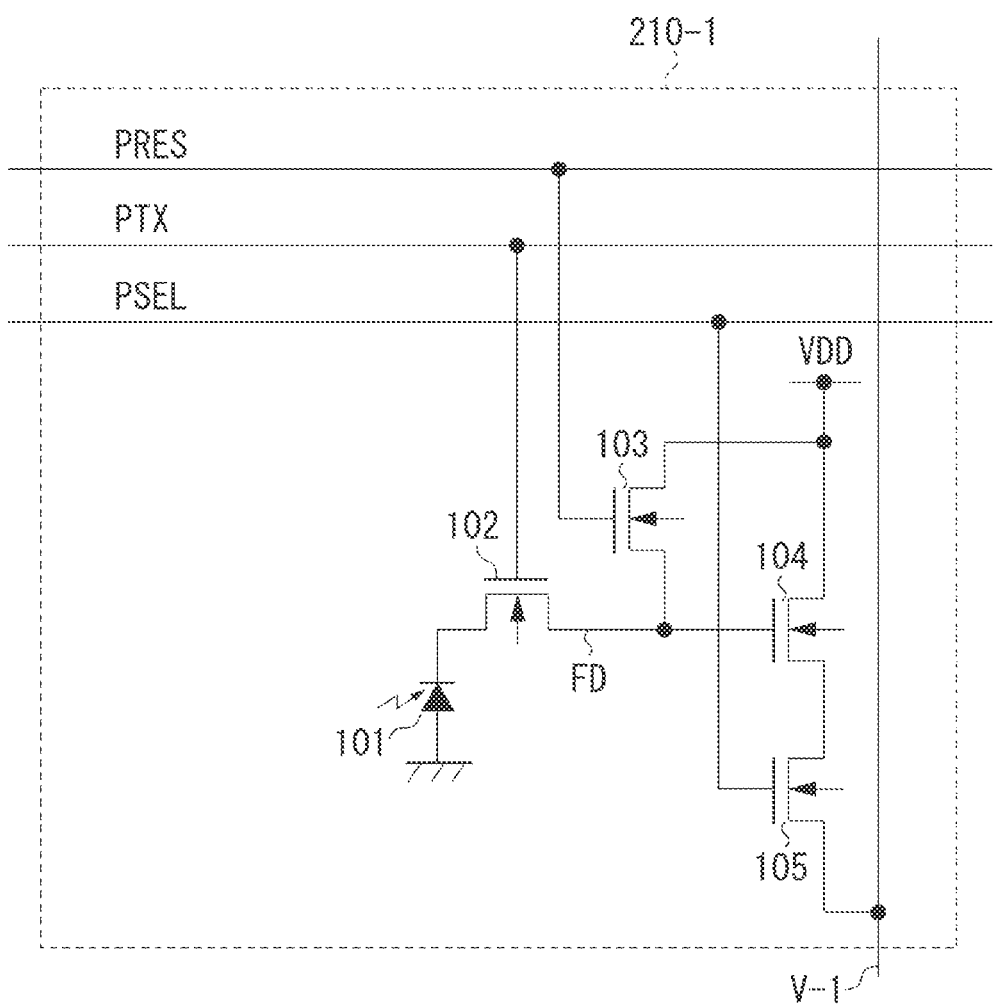
FIG. 8 illustrates an equivalent circuit of a pixel.

FIG. 8 is a circuit diagram illustrating one of the pixels 210-1 illustrated in FIG. 7. Referring to FIG. 8, a transfer switch 102 is driven by a transfer pulse PTX. A reset switch 103 is driven by a reset pulse PRES. A row selection switch 105 is driven by a row selection pulse PSEL. The transfer pulse PTX represents transfer pulses PTX1, PTX2, . . . and PTXn (wherein n is the number of the row). The reset pulse PRES represents reset pulses PRES1, PRES2, . . . and PRESn. The row selection pulse PSEL represents row selection pulses PSEL1, PSEL2, . . . and PSELn. It is not necessary for the pixel unit 210-1 to include the row selection switch 105. In such a case, the reset switch 103 sets the potential of a gate of an amplifying MOS field-effect transistor (MOSFET) 104 for selecting or not selecting the pixel.

Figure 9:
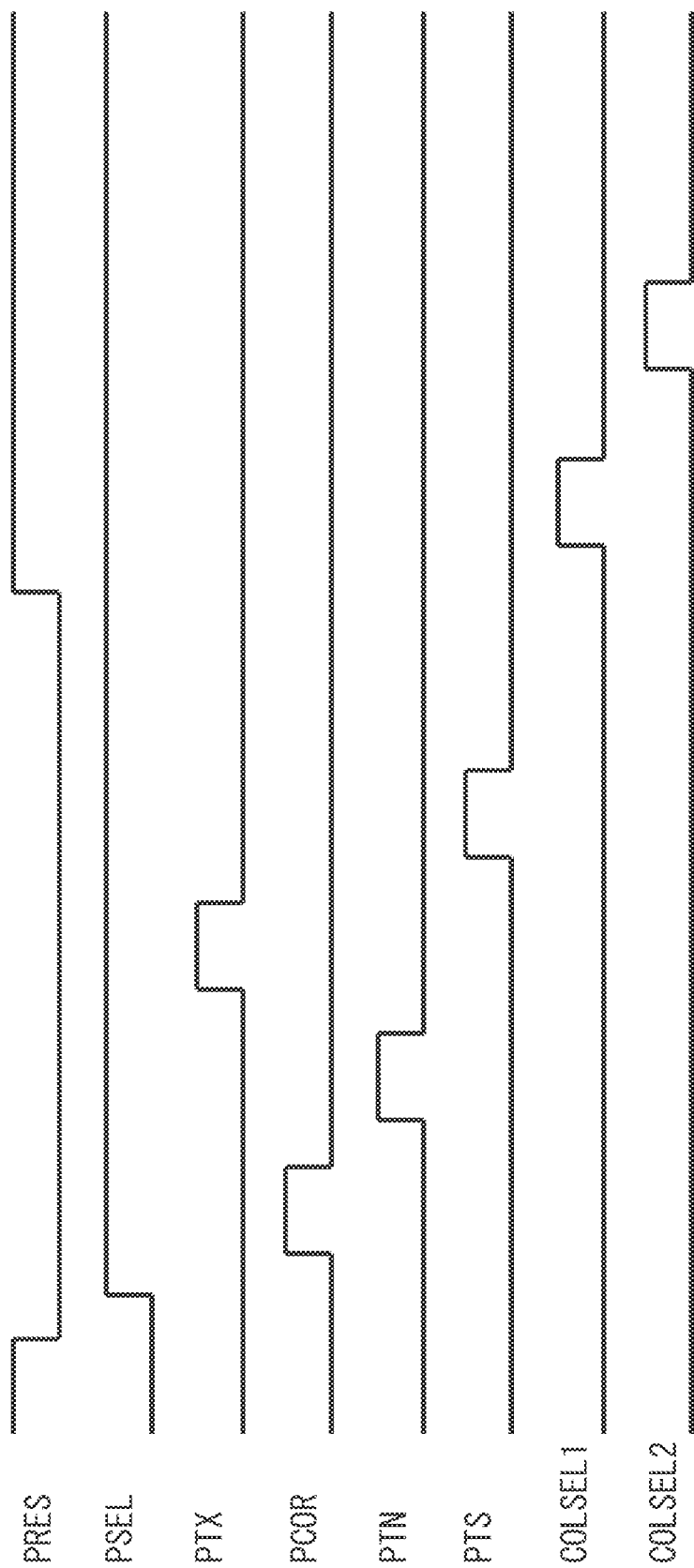
FIG. 9 is a timing chart illustrating an example of the operation of the solid-state imaging device illustrated in FIG. 7.

FIG. 9 is a timing chart illustrating the operation example of the solid-state imaging device illustrated in FIG. 7. The operation example of the solid-state imaging device will be described below with references to FIGS. 7, 8, and 9. The pixel unit 210 is exposed at a set exposing time prior to performing the readout operation, and a photoelectric charge is accumulated in a photodiode 101 illustrated in FIG. 8. It is assumed below that the row to be driven is selected by PRES1, PTX1, and PSEL1 output from a vertical scanning circuit 215 illustrated in FIG. 7.

Referring to FIG. 9, the pixel reset pulse PRES changes from a high level to a low level, so that the reset state of a gate electrode of the amplifying MOSFET 104 is released. In such a case, a floating diffusion portion FD connected to the gate electrode maintains the potential corresponding to releasing of the reset state. The row selection pulse PSEL then changes to the high level, and the output corresponding to the potential of the floating diffusion portion FD appears in a vertical output line V-1. This is caused by a source follower circuit formed by the amplifying MOSFET 104 and a constant current source 107 illustrated in FIG. 7. When a clamp pulse PCOR is activated to the high level in such a state, a clamp switch 109 illustrated in FIG. 7 becomes switched on so that a variable amplifying unit 131 changes to a voltage follower state. The output from the electrode on a column amplifier side of a clamp capacitor 108 thus becomes proximately equal to a voltage VREF. The clamp pulse PCOR is then deactivated from the high level to the low level, and the output on the vertical output line V-1 becomes clamped.

An sampling and holding pulse PTN is activated to the high level, and an offset signal of the amplifying circuit 220-1 is stored in a storage capacitor 112n illustrated in FIG. 7 via a transfer gate 110n. The transfer pulse PTX is then activated to the high level so that the transfer switch 102 changes to the high level for a predetermined period. The photoelectric charge accumulated in the photodiode 101 is thus transferred to the gate electrode of the amplifying MOSFET 104. In such a case, the charge to be transferred is the electron, and the gate potential decreases by Q/CFD, where an absolute value of an amount of transferred charge is Q and the capacitance of the floating diffusion portion FD is CFD. The potential of the vertical output line V-1 then changes accordingly. If a source follower gain is Gsf, a change amount $\Delta Vv1$ of the potential $Vv1$ of the vertical output line V-1 caused by transferring the charge from the photodiode 101 to the floating diffusion portion FD is expressed by equation (1).

$$\Delta Vv1 = -Q \times Gsf/CFD \quad (1)$$

A variable amplification unit 131 illustrated in FIG. 7 including an operating amplifier 120, the clamp capacitor 108, and a feedback capacitor 121 performs voltage amplification on the potential change $\Delta Vv1$. An output Vct of the variable amplification unit 131 thus becomes as illustrated in equation (2).

$$Vct = VREF + Q \times (Gsf/CFD) \times (C0/Cf) \quad (2)$$

where C0 indicates a capacitance value of the clamp capacitor 108, Cf indicates the capacitance values of feedback capacitors 121a, 121b, and 121c which are respectively selected when sensitivity switching pulses x1, x2, and x4 are activated.

For example, C0 is 1 pF. If the feedback capacitor 121a is selected, Cf becomes 1 pF, if the feedback capacitor 121b is selected, Cf becomes 0.5 pF, and if the feedback capacitor 121c is selected, Cf becomes 0.25 pF. A voltage amplification rate indicated by −C0/Cf thus becomes −1 times, −2 times, and −4 times respectively.

In other words, the feedback capacitance is selected from the plurality of feedback capacitors 121a, 121b, and 121c in a system in which a negative feedback is applied to the operation amplifier 120. As a result, a feedback coefficient, determined by a voltage division ratio between Cf and C0, may be changed, and the voltage amplification rate may be switched. The voltage amplification rate is a negative value due to the amplifying circuit being an inverting amplifier circuit. The sampling and holding pulse PTS changes to the high level after the transfer pulse PTX changes to the low level, and the level output from the amplifying circuit 220-1 is accumulated in the storing capacitor 112s via the transfer gate 110s.

Column selection switches 114s and 114n illustrated in FIG. 7 are sequentially switched on by scanning pulses COLSEL1, COLSEL2, . . . generated by the horizontal scanning circuit 65. The signal accumulated in the storing capacitor 112s is then output to a horizontal output line 116s in an order of the columns, and the signal accumulated in the storing capacitor 112n is output to a horizontal output line 116n in the order of the columns. A signal pair of a plurality of columns is sequentially output to the horizontal output lines 116s and 116n. The differential processing unit 118 outputs the difference between the signal pairs of each column output to the horizontal output lines 116s and 116n. As a result, the noise component included in the signal stored in the storing capacitor 112s may be reduced.

If the solid-state imaging device includes the CDS circuit prior to the comparison unit 3, an N signal to be described below corresponds to the signal sampled by the signal PTN as illustrated in FIG. 9. On the other hand, if the solid-state imaging device does not include the CDS circuit, the N signal corresponds to the signal output to the vertical output line V-1 in response to resetting the floating diffusion portion FD. Further, if the solid-state imaging device includes the CDS circuit prior to the comparison unit 3, an S signal to be described below corresponds to the signal sampled by the signal PTS as illustrated in FIG. 9. On the other hand, if the solid-state imaging device does not include the CDS circuit, the S signal corresponds to the signal output to the vertical output line V-1 as a result of transferring to the floating diffusion portion FD the charge generated in the photodiode 101.

Figure 2:
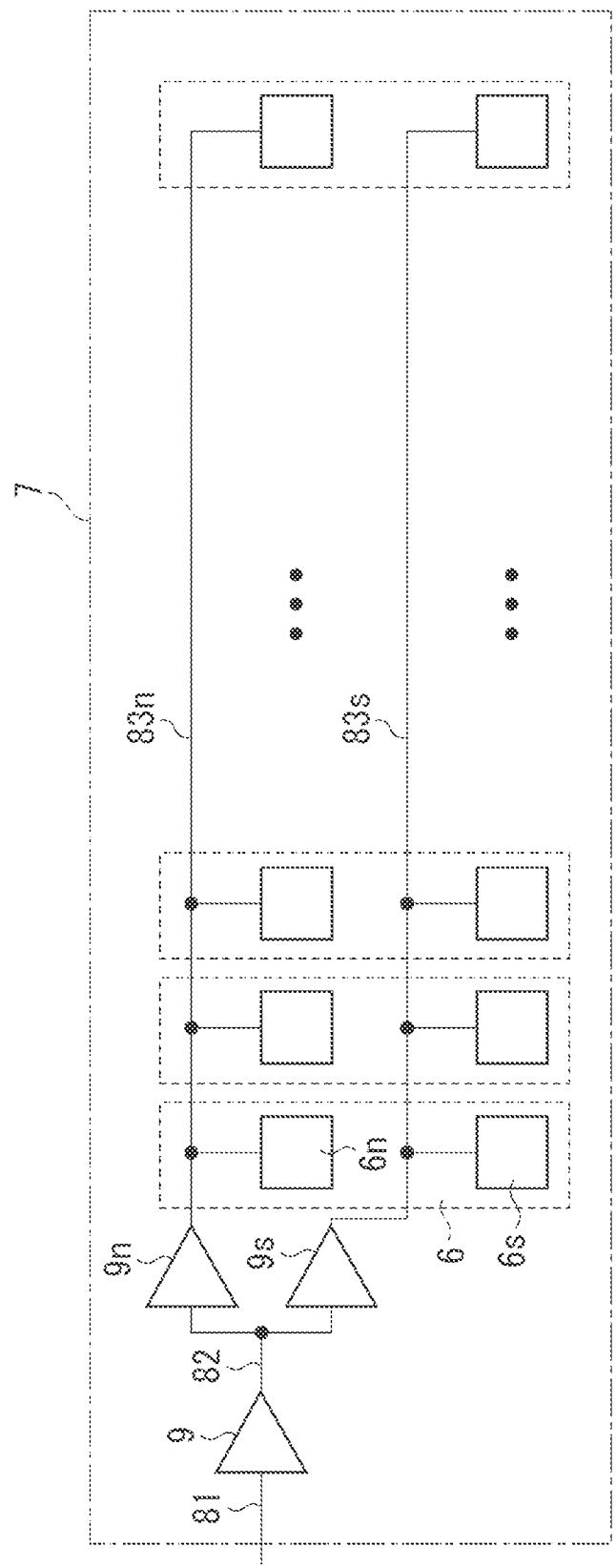
FIG. 2 illustrates a configuration example of a storing unit in the solid-state imaging device illustrated in FIG. 1.

FIG. 2 illustrates a configuration example of the storing section 7 illustrated in FIG. 1. Referring to FIG. 2, the storing unit 6 includes a first storing unit (i.e., N memory) 6n and a second storing unit (i.e., S memory) 6s in each column. The first storing unit (N memory) 6n stores the count value of the N signal when the pixel is in the reset state. The second storing unit (S memory) 6s stores the count value of the S signal when the pixel is in the non-reset state. The counter 5 outputs 12 or 10 count pulses according to a resolution (i.e., a bit number) of the A/D conversion, and a plurality of storing units 6 corresponding to the bit number is included in each column. FIG. 2 schematically illustrates 1 bit among a plurality of bits configuring the count pulses and the storing units 6.

The count value output from the counter 5 illustrated in FIG. 1 is input to a third buffer 9 via a connecting line 81. The third buffer 9 buffers the count value of the counter 5, and outputs the count value to a first buffer 9n and a second buffer 9s via a connecting line 82. A first connecting line 83n is connected to an output terminal of the first buffer 9n and the first storing unit 6n. The first buffer 9n buffers the output signal from the third buffer 9, and outputs the output signal to the first storing unit 6n via the first connecting line 83n. A second connecting line 83s is connected to the output terminal of the second buffer 9s and the second storing unit 6s. The second buffer 9s buffers the output signal from the third buffer 9, and outputs the output signal to the second storing unit 6s via the second connecting line 83s.

Referring to FIG. 1, the output from the readout circuit 2 and the reference signal generated by the reference signal generation unit 4 are input to the comparison unit 3. The comparison unit 3 compares the sizes of the potentials of the signal output from the readout circuit 2 and the reference signal, and outputs a high-level signal or a low-level signal according to the comparison result. When the magnitude relation between the potential of the signal output from the readout circuit 2 and the potential of the reference signal becomes inverted, the output from the comparison unit 3 changes from the high level to the low level, or from the low level to the high level. The storing unit 6 thus stores when the output potential of the comparison unit 3 is inverted, the count value output from the counter 5.

The digital data stored in the storing unit 6 is sequentially transferred to the signal processing circuit for each column by the signal output from the horizontal scanning circuit 65 illustrated in FIG. 7. The signal processing circuit then acquires the difference between the count value of the N signal when the pixel is in the reset state and the count value of the S signal when the pixel is in the non-reset state, and extracts the signal component of the pixel. Further, the signal processing circuit performs other calculations as necessary, and outputs the result.

Figure 3:
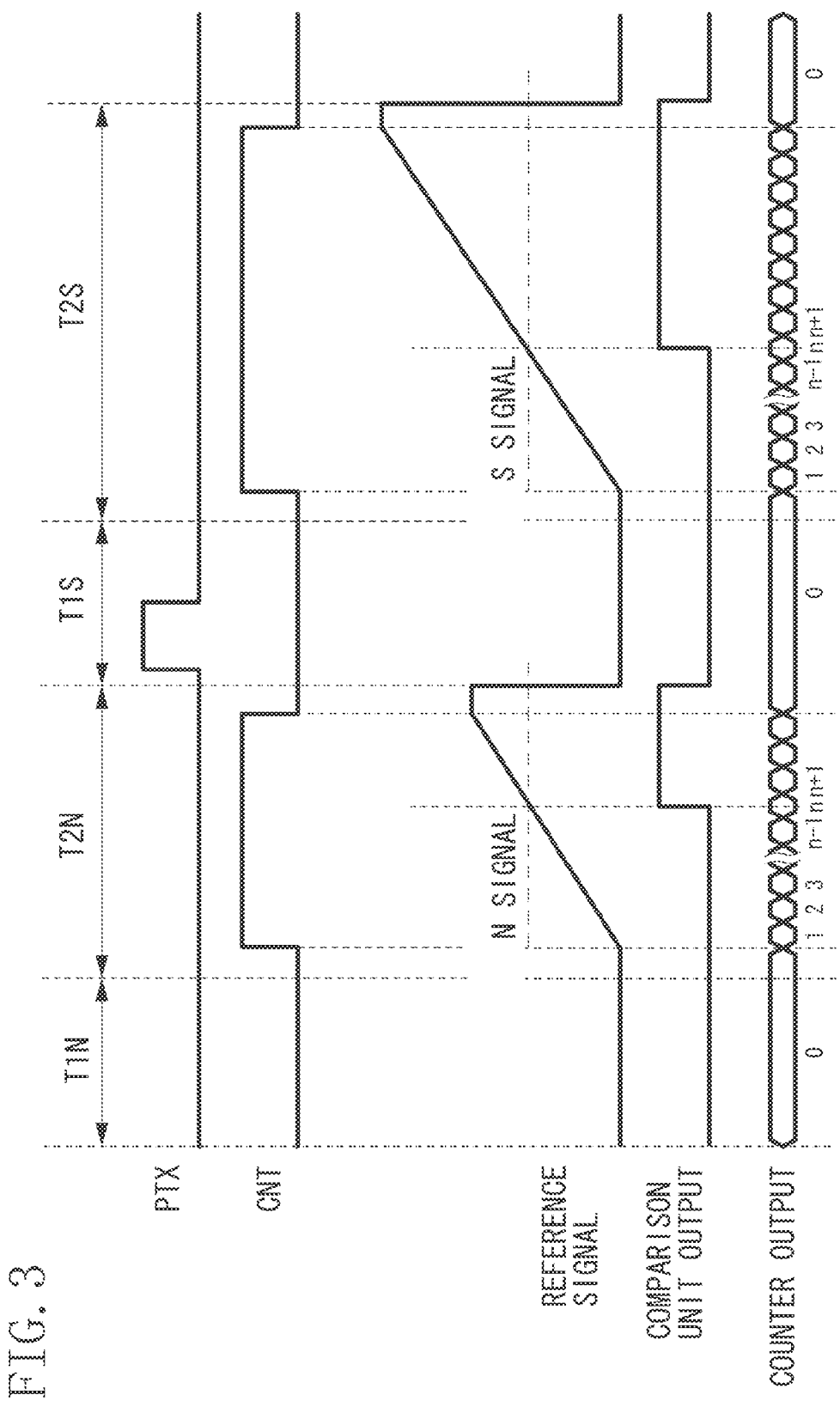
FIG. 3 is a timing chart illustrating an operation of the solid-state imaging device illustrated in FIG. 1.

FIG. 3 is a timing chart illustrating the operation of the solid-state imaging device illustrated in FIG. 1, corresponding to the timing at which A/D conversion is performed on the signals from the pixels in one row. The timing chart illustrated in FIG. 3 includes signal readout periods T1N and T1S, and A/D conversion periods T2N and T2S. The A/D conversion of the N signal when the pixel is in the reset state is performed in the A/D conversion period T2N. The A/D conversion of the S signal when the pixel is in the non-reset state is performed in the A/D conversion period T2S. Further, the timing chart illustrated in FIG. 3 corresponds to image capturing in the dark state, so that the N signal and the S signal are equivalent, and the count value stored in the first storing unit (N memory) 6n and the count value stored in the second storing unit (S memory) 6s are both n.

Referring to FIG. 3, in the period T1N, the readout circuit 2 reads out the analog N signal sampled by the signal PTN illustrated in FIG. 9. When a counter operation signal CNT then changes to the high level in the period T2N, the counter 5 starts a count-up operation, and the reference signal generation unit 4 starts generating the reference signal. An initial value of the counter 5 is set to 0, and the counter 5 counts the time from when the level of the reference signal starts to change. The reference signal changes with time. For example, the reference signal may be a ramp signal in which the level linearly changes with time, or may be a signal in which the level changes stepwise. In the example illustrated in FIG. 3, the reference signal is the ramp signal.

When the counter operation signal CNT changes to the high-level signal, the level of the reference signal starts to incline. The output of the comparison unit 3 changes from the low level to the high level as illustrated in the comparison unit output of FIG. 3 when the potential of the reference signal becomes greater than the potential of the N signal. In such a case, the count value of the counter 5 (i.e., n according to the present exemplary embodiment) is written in the first storing unit 6n as the digital data of the A/D conversion result.

The output signal from the first buffer 9n is input to the first storing unit 6n, and the first storing unit 6n stores the count value of the N signal output from the readout circuit 2 when the pixel 210-1 is in the reset state. The transfer pulse PTX (illustrated in FIG. 9) then changes to the high level in the period T1S, and the readout circuit 2 reads out the S signal sampled by the signal PTS illustrated in FIG. 9.

When the counter operation signal CNT changes to the high level in the period T2S, the counter 5 starts the count-up operation and the reference signal generation unit 4 starts generating the reference signal, similarly as in the period T2N. The output of the comparison unit 3 changes from the low level to the high level when the potential of the reference signal becomes greater than the potential of the S signal, as indicated as the comparison unit output illustrated in FIG. 3. In such a case, the count value of the counter 5 (i.e., n according to the present exemplary embodiment) is written in the second storing unit 6s as the digital data of the A/D conversion result. The output signal from the second buffer 9s is input to the second storing unit 6s, and the second storing unit 6s stores the count value of the S signal output from the readout circuit 2 when the pixel 210-1 is in the non-reset state.

The digital data written in the storing units 6n and 6s are then sequentially transferred to the signal processing circuit for each column by the signal output from the horizontal scanning circuit 65 illustrated in FIG. 7. The signal processing circuit acquires the difference between the count value of the N signal stored in the first storing unit 6n and the count value of the S signal stored in the second storing unit 6s, and thus extracts the signal component of the pixel. The pixels in all rows or a portion of the rows may be read out by changing the row of the pixels to be read out and repeating the process according to the timing chart illustrated in FIG. 3.

If there is a difference in the propagation delays in the connecting line 83n and the connecting line 83s illustrated in FIG. 2, the above-described problem occurs. According to the present exemplary embodiment, the count signal input to the storing units 6n and 6s are signals acquired by buffering the same output of the buffer 9 in each of the buffers 9n and 9s. As a result, waveforms with less rounding may be input to the storing units 6n and 6s, and the effect of the difference in the propagation delays in the connecting line 83n and the connecting line 83s may be reduced.

All or a portion of the buffers 9, 9n, and 9s may be included as a portion of the counter 5. Further, it is not necessary for the readout circuit 2 to include the CDS circuit. Furthermore, the readout circuit 2 may be a wiring which connects the pixel and the comparison unit 3. In other words, the solid-state imaging device may be of any configuration as long as the comparison unit 3 may convert the N signal and the S signal for performing the digital CDS.

Figure 4:
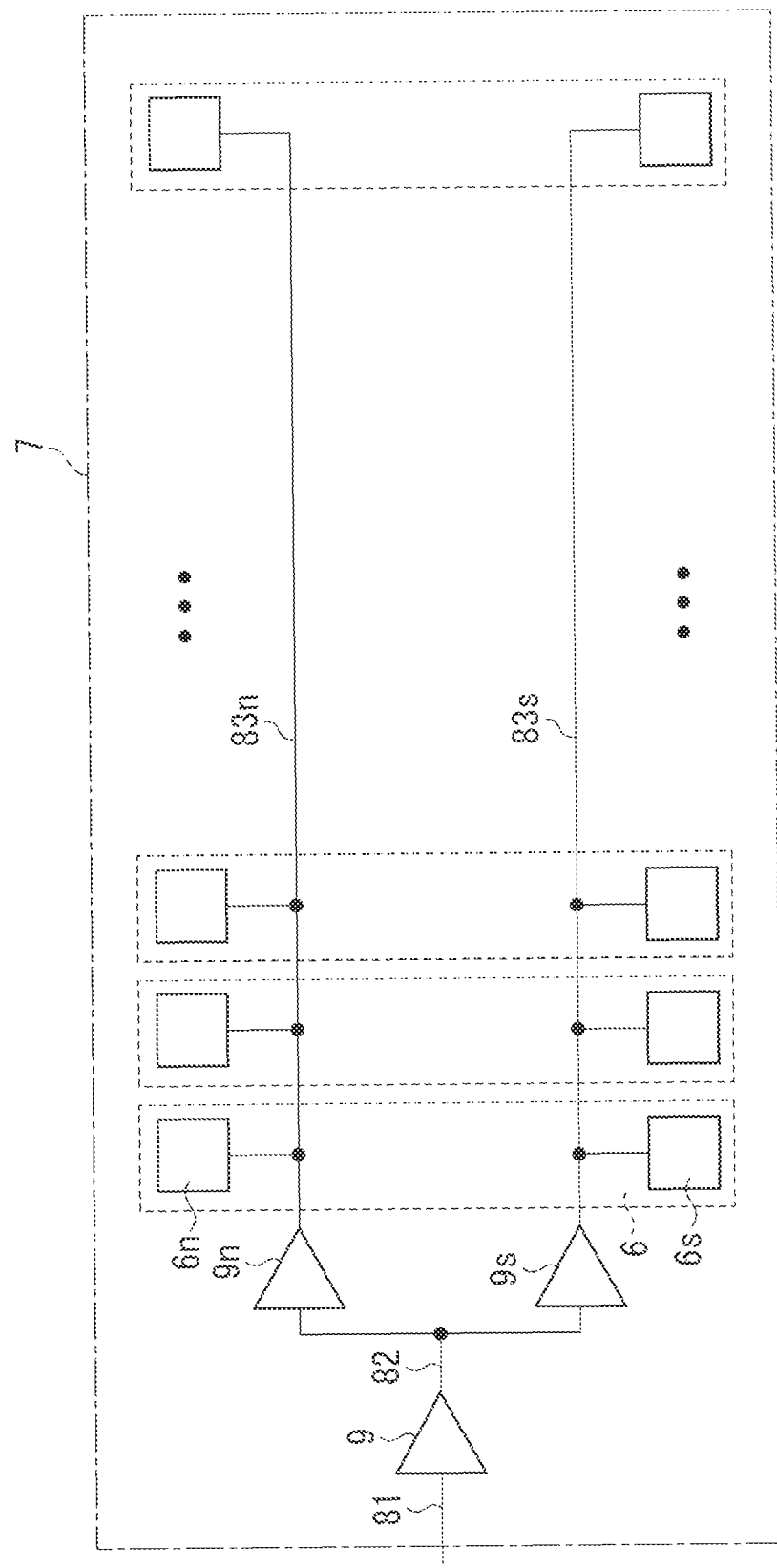
FIG. 4 illustrates a configuration example of the storing unit according to a second exemplary embodiment.

The second exemplary embodiment will be described below. FIG. 4 illustrates a configuration example of the storing section 7 in the solid-state imaging device according to the second exemplary embodiment. The differences between the present exemplary embodiment and the first exemplary embodiment will be described below.

Referring to FIG. 2, the first storing unit 6n is arranged below the first connecting line 83n, and the second storing unit 6s is arranged below the second connecting line 83s. In other words, the direction in which the first storing unit 6n is arranged with respect to the first connecting line 83n is the same as the direction in which the second storing unit 6s is arranged with respect to the second connecting line 83s.

In contrast, referring to FIG. 4, the first storing unit 6n is arranged above the first connecting line 83n, and the second storing unit 6s is arranged below the second connecting line 83s. More specifically, the direction in which the first storing unit 6n is arrange with respect to the first connecting line 83n is opposite of the direction in which the second storing unit 6s is arranged with respect to the second connecting line 83s. According to the present exemplary embodiment, the storing units 6n and 6s are arranged to be vertically-symmetrical. As a result, the difference between the propagation delays in the connecting lines 83n and 83s may be more appropriately reduced.

Figure 5:
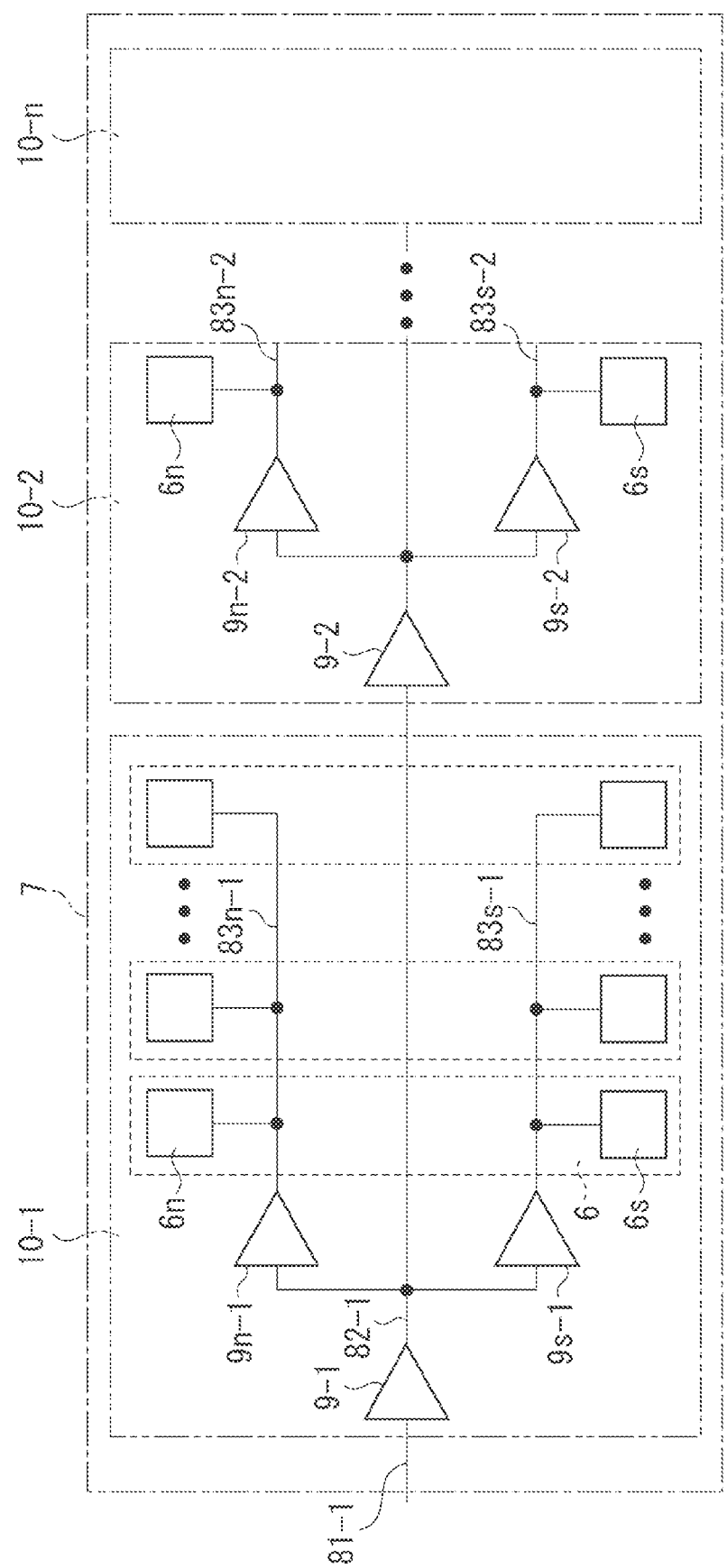
FIG. 5 illustrates a configuration example of the storing unit according to a third exemplary embodiment.

The third exemplary embodiment will be described below. FIG. 5 illustrates a configuration example of the storing section 7 in the solid-state imaging device according to the third exemplary embodiment. The differences between the present exemplary embodiment and the second exemplary embodiment will be described below.

Referring to FIG. 5, the storing section 7 includes a plurality of storing unit blocks 10-1, 10-2, ..., and 10-n which are similarly configured as the storing section 7 illustrated in FIG. 4. Each of the storing unit blocks 10-1, 10-2, ..., and 10-n includes a plurality of groups each configured of the first buffer 9n, the second buffer 9s, and the third buffer 9.

The configuration of the storing unit 10-1 will be described below. The count value of the counter 5 is input to a third buffer 9-1 via a connecting line 81-1. The output from the third buffer 9-1 is input to a first buffer 9n-1 and a second buffer 9s-1 via a connecting line 82-1. The outputs from the first buffer 9n-1 and the second buffer 9s-1 are respectively input to the first storing unit 6n and the second storing unit 6s in the storing unit block 10-1 via a first connecting line 83n-1 and a second connecting line 83s-1.

The output from the third buffer 9-1 is input to a fourth buffer 9-2 in the storing unit block 10-2. The fourth buffer 9-2 buffers the output signal form the third buffer 9-1. A fifth buffer 9n-2 buffers the output signal from the fourth buffer 9-2. A sixth buffer 9s-2 buffers the output signal from the fourth buffer 9-2. The output signal from the fifth buffer 9n-2 is input to the first storing unit 6n in the storing unit block 10-2 via a third connecting line 83n-2. The output signal from the sixth buffer 9s-2 is input to the second storing unit 6s in the storing unit block 10-2 via a fourth connecting line 83s-2.

As described above, the first storing unit 6n and the second storing unit 6s in the storing unit block 10-1 in a portion of the columns among the plurality of storing units 6 respectively input the output signals from the first buffer 9n-1 and the second buffer 9s-1. Further, the first storing unit 6n and the second storing unit 6s in the storing unit block 10-2 in another portion of the columns among the plurality of storing units 6 respectively input the output signals from the fifth buffer 9n-2 and the sixth buffer 9s-2. The subsequent output signals are similarly input to the storing units 6n and 6s in the storing unit block 10-3 to the storing unit block 10-n. According to the present exemplary embodiment, the count signals may be driven by the buffers 9n and 9s even when there is a large number of pixels and thus a large number of storing units 6.

Figure 6:
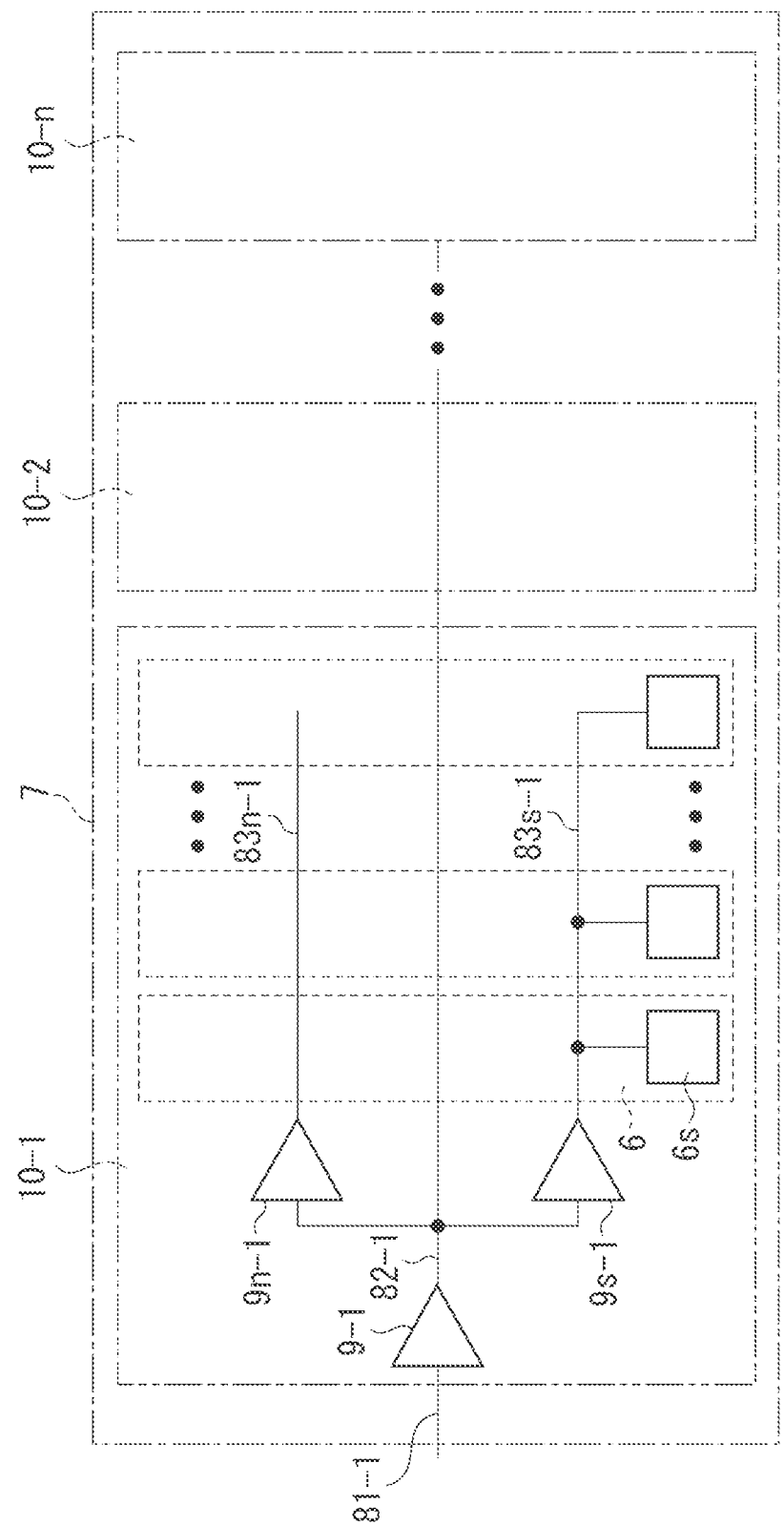
FIG. 6 illustrates a configuration example of the storing unit according to a fourth exemplary embodiment.

The fourth exemplary embodiment will be described below. FIG. 6 illustrates a configuration example of the storing section 7 in the solid-state imaging device according to the fourth exemplary embodiment. The differences between the present exemplary embodiment and the third exemplary embodiment will be described below.

According to the present exemplary embodiment, the resolution (i.e., the bit number) of the A/D conversion is different between the A/D conversion of the N signal and the A/D conversion of the S signal. The storage bit number of the first storage unit 6n is different from the storage bit number of the second storage unit 6s. For example, it is assumed that the resolution of the A/D conversion is 10 bits for the N signal, and 12 bits for the S signal. Further, it is assumed that the storage capacity of the first storing unit 6n with respect to the count value of the N signal is 10 bits, and the storage capacity of the second storing unit 6s with respect to the count value of the S signal is 12 bits. In such a case, the counter 5 and the storing unit 6 are connected as illustrated in FIG. 5 for the first 10 bits, and as illustrated in FIG. 6 for the 11$^{th}$ bit and the 12$^{th}$ bit. Referring to FIG. 6, the first storing unit 6n is omitted from the configuration illustrated in FIG. 5. The buffer 9-1 drives the buffers 9n-1 and 9s-1 and the buffer 9-2 in the storing unit block 10-2, similarly as illustrated in FIG. 5, so that there is no difference between the propagation delays with respect to the bits.

As described above, according to the first, second, third, and fourth exemplary embodiments, the fixed noise component in each column due to the difference between the propagation delays of the count values may be reduced by including the first buffer 9n and the second buffer 9s.

Figure 10:
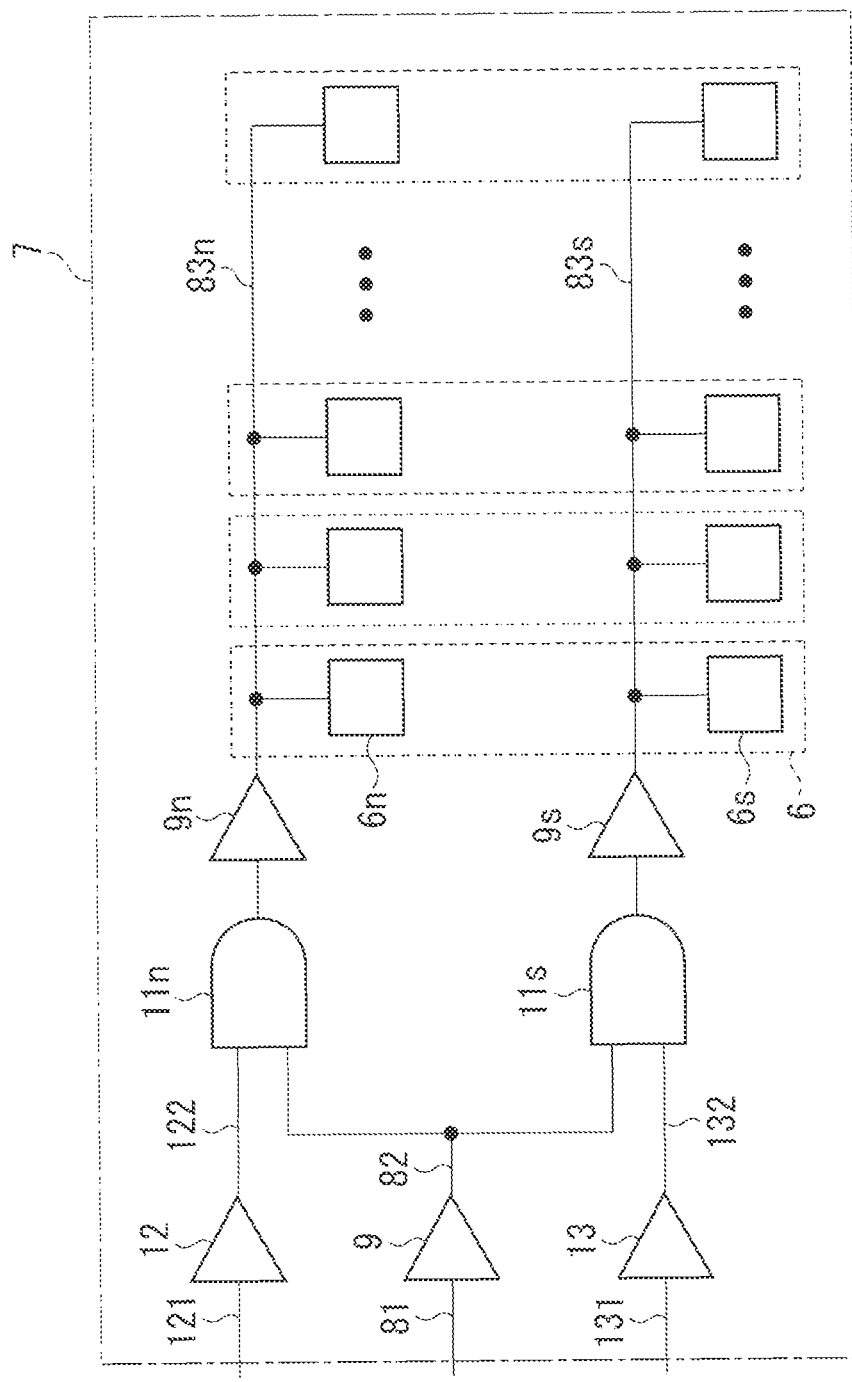
FIG. 10 illustrates a configuration example of the storing unit according to a fifth exemplary embodiment.

The fifth exemplary embodiment will be described below. FIG. 10 illustrates a configuration example of the storing section 7 in the solid-state imaging device according to the fifth exemplary embodiment. The differences between the present exemplary embodiment and the first exemplary embodiment will be described below.

Referring to FIG. 10, the storing section 7 includes buffers 12 and 13, and AND circuits 11n and 11s, in addition to the configuration of the storing unit 7 illustrated in FIG. 2. The output from the buffer 9 is input to the AND circuits 11n and 11s via the connecting line 82. The N memory selection pulse is input to the N memory selection buffer 12 via an N memory selection signal connecting line 121. The output from the N memory selection buffer 12 is input to the AND circuit 11n via an N memory selection signal connecting line 122. The AND circuit 11n outputs to the buffer 9n an AND signal of the output signal from the N memory selection buffer 12 and the output signal from the buffer 9.

Similarly, the S memory selection pulse is input to the S memory selection buffer 13 via an S memory selection signal connecting line 131. The output from the S memory selection buffer 13 is input to the AND circuit 11s via an S memory selection signal connecting line 132. The AND circuit 11s outputs to the buffer 9s the AND signal of the output signal from the S memory selection buffer 13 and the output signal from the buffer 9.

By adding the AND circuit 11n and the N memory selection buffer 12 to the storing section 7 illustrated in FIG. 2, the count pulse of the buffer 9 is transferred to the buffer 9n only during the period when the N memory selection pulse is in the high level. During the period when the N memory selection pulse is in the low level, the output of the buffer 9n is fixed at the low level, and the count pulse is not transferred from the buffer 9 to the buffer 9n. Similarly, by adding the AND circuit 11s and the S memory selection buffer 13, the count pulse of the buffer 9 is transferred to the buffer 9s only during the period when the S memory selection pulse is in the high level. During the period when the S memory selection pulse is in the low level, the output of the buffer 9s is fixed at the low level, and the count pulse is not transferred from the buffer 9 to the buffer 9s.

Figure 11:
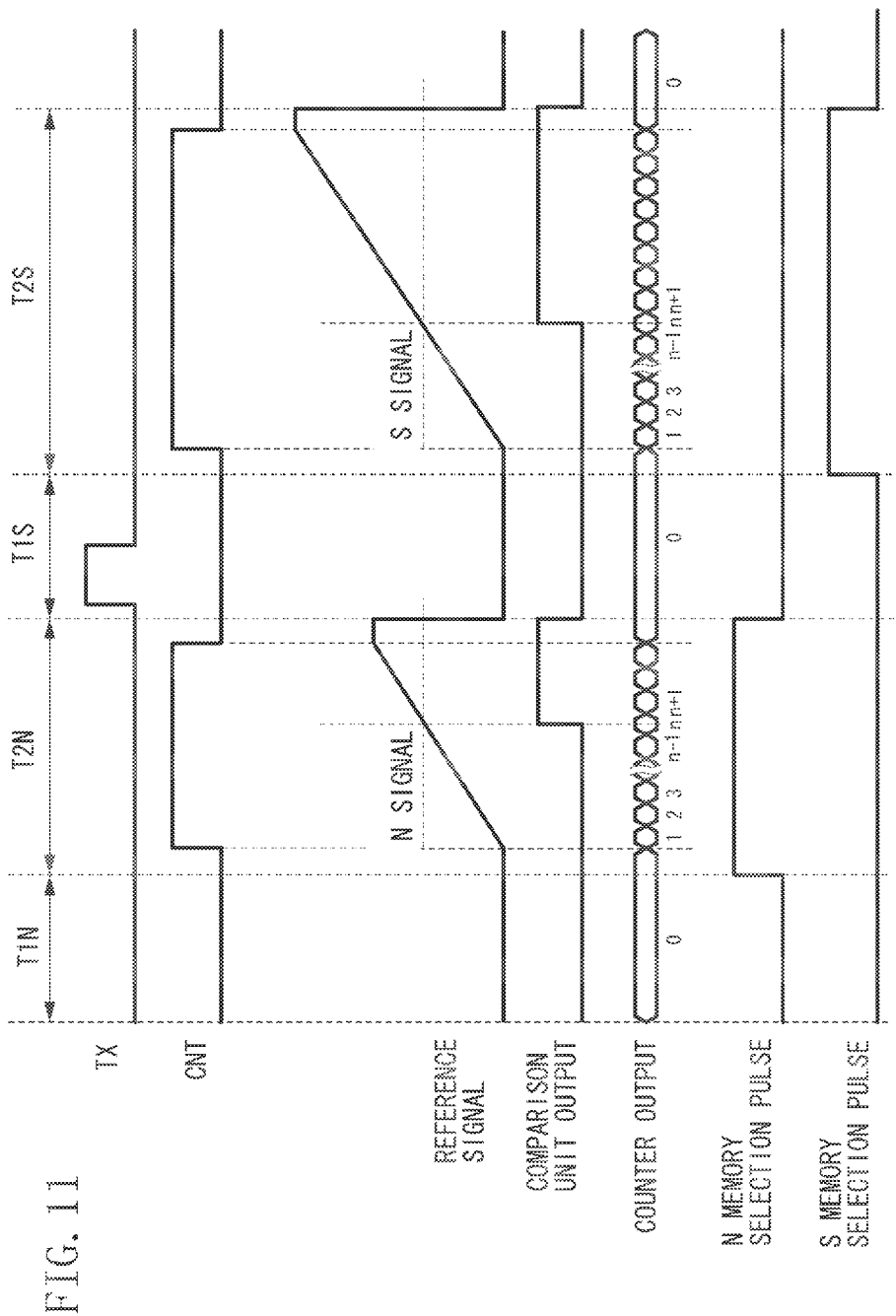
FIG. 11 is a timing chart illustrating an example of the operation of the storing unit illustrated in FIG. 10.

FIG. 11 is a timing chart illustrating the operation of the solid-state imaging device including the storing section 7 illustrated in FIG. 10. The difference between the timing chart illustrated in FIG. 11 and the timing chart illustrated in FIG. 3 will be described below.

During a period T2N, the A/D conversion result corresponding to the pixel in the reset state is written in the first storing unit 6n of each bit. When the counter operation signal CNT changes to the high level, the counter 5 starts the count-up operation and the reference signal generation unit 4 starts generating the reference signal. If the N memory selection pulse in the line 121 is set to the high level and the N memory selection pulse in the line 131 is set to the low level during such a period, the count pulse of the buffer 9 is transferred to the first connecting line 83n and not to the second connecting line 83s. As a result, charge/discharge by the count pulse in the second connecting line 83s is reduced, and power consumption may be decreased.

Similarly, in a period T2S, the A/D conversion result corresponding to the signal voltage of the pixel is written in the second storing unit 6s of each bit. If the S memory selection pulse in the line 131 is set to the high level and the N memory selection pulse in the line 121 is set to the low level during such a period, the count pulse of the buffer 9 is transferred to the second connecting line 83s and not to the first connecting line 83n. As a result, charge/discharge by the count pulse in the first connecting line 83n is reduced, and power consumption may be decreased.

In other words, during the periods T2N and T2S, only the buffer which is necessary for performing conversion in each period operates, so that power consumption may be decreased. According to the above-described exemplary embodiment, the AND circuits 11n and 11s are employed. However, any other method may be used as long as a transfer unit switches between transferring and not transferring the count pulse to each of the connecting lines 83n and 83s. More specifically, during the period T2N when the count value of the counter 5 is stored in the first storing unit 6n, the transfer units 11n and 11s transfer the count value of the counter 5 to the first buffer 9n and not to the second buffer 9s. Further, during the period T2S when the count value of the counter 5 is stored in the second storing unit 6n, the transfer units 11n and 11s transfer the count value of the counter 5 to the second buffer 9s and not to the first buffer 9n.

Figure 12:
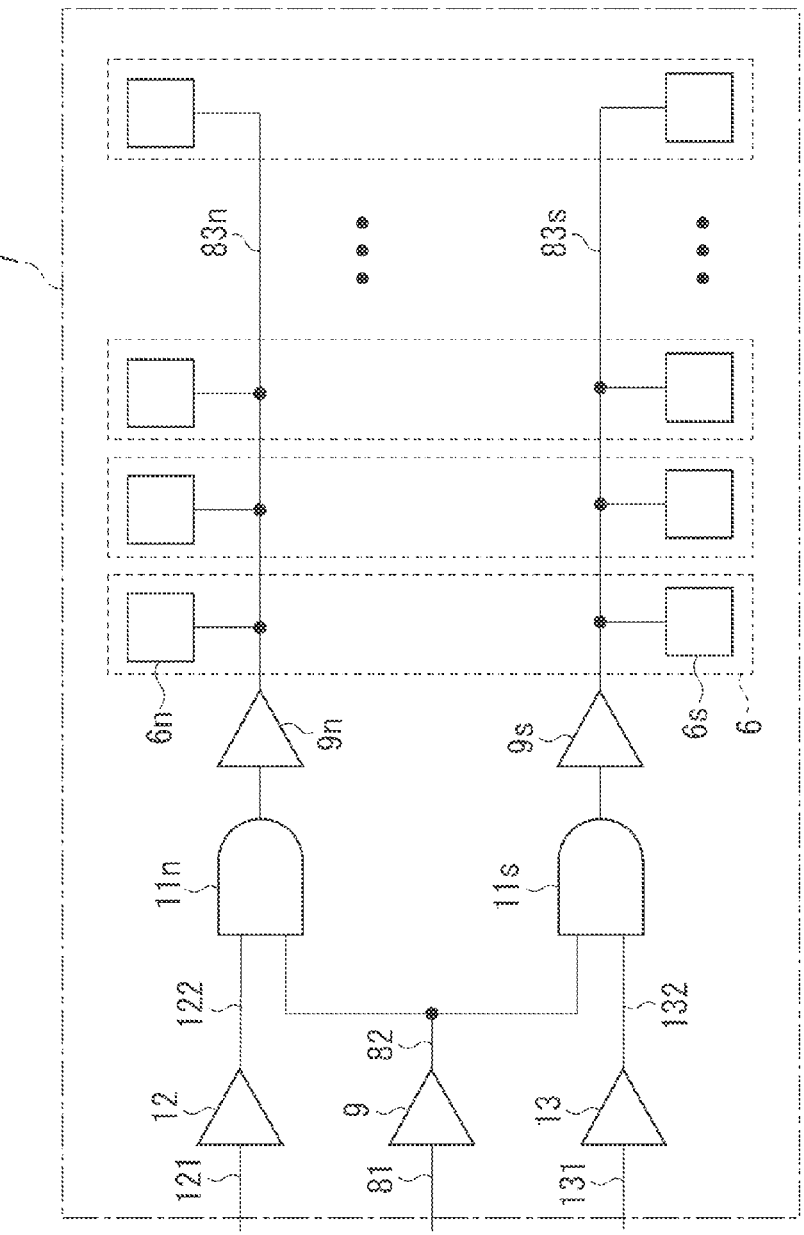
FIG. 12 illustrates an another configuration example of the storing unit.

FIG. 12 illustrates another configuration example of the storing section 7 in which the storing unit 6n and the storing unit 6s are arranged to be vertically-symmetrical as in the second exemplary embodiment (illustrated in FIG. 4). In other words, the first storing unit 6n is arranged above the first connecting line 83n, and the second storing unit 6s is arranged below the second connecting line 83s. As a result, the difference between the propagation delays in the connecting lines 83n and 83s may be reduced, similarly as in the second exemplary embodiment.

Figure 13:
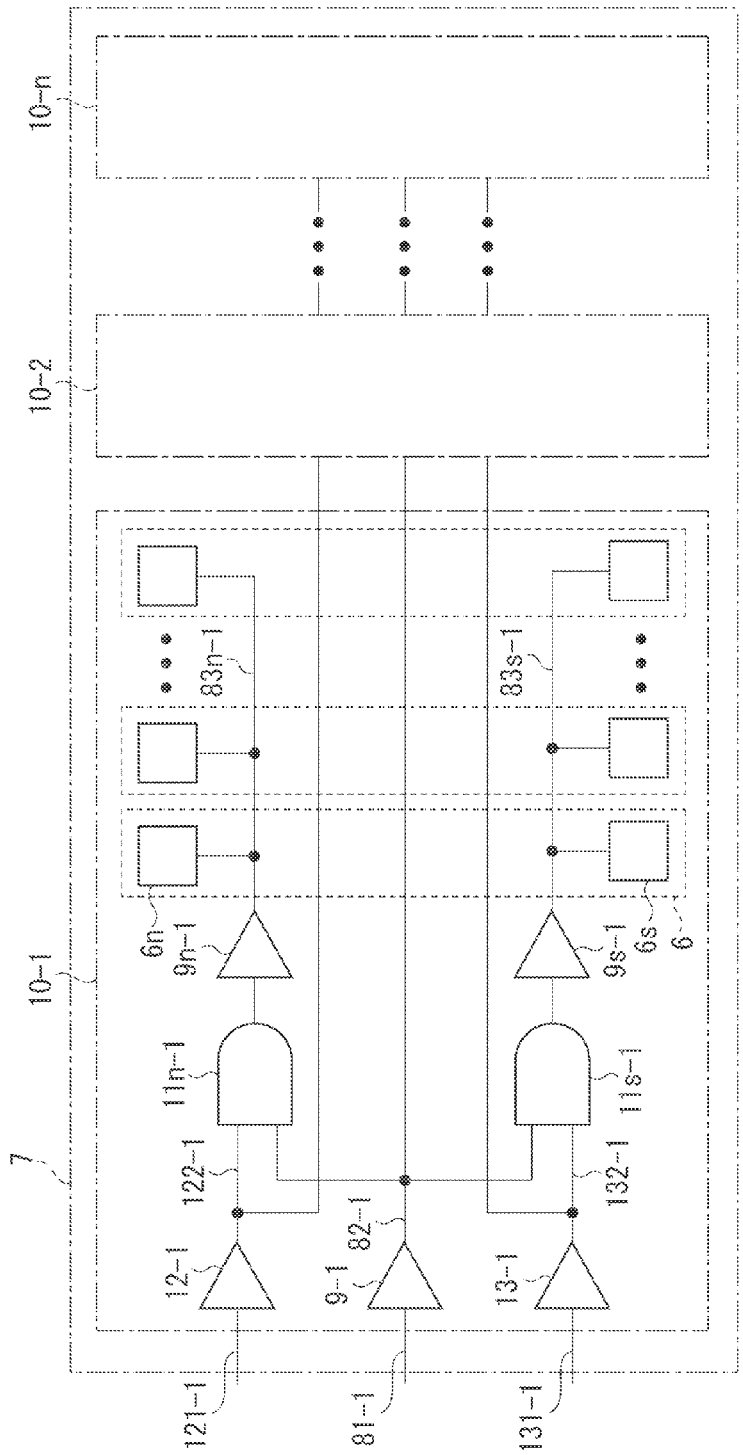
FIG. 13 illustrates a configuration example of the storing unit according to a sixth exemplary embodiment.

The sixth exemplary embodiment will be described below. FIG. 13 illustrates a configuration example of the storing section 7 in the solid-state imaging device according to the sixth exemplary embodiment. The differences between the present exemplary embodiment and the third exemplary embodiment will be described below. Referring to FIG. 13, the storing unit block 10-1 includes buffers 12-1 and 13-1, and AND circuits 11n-1 and 11s-1 in addition to the configuration of the storing unit 10-1 illustrated in FIG. 5, similarly as in the fifth exemplary embodiment.

The output from the buffer 9-1 is input to the AND circuits 11n-1 and 11s-1 via the connecting line 82-1. The N memory selection pulse is input to the N memory selection buffer 12-1 via an N memory selection signal connecting line 121-1. The output from the N memory selection buffer 12-1 is input to the AND circuit 11n-1 via an N memory selection signal connecting line 122-1. The AND circuit 11n-1 outputs to the buffer 9n-1 an AND signal of the output signal from the N memory selection buffer 12-1 and the output signal from the buffer 9-1.

similarly, the S memory selection pulse is input to the S memory selection buffer 13-1 via an S memory selection signal connecting line 131-1. The output from the S memory selection buffer 13-1 is input to the AND circuit 11s-1 via an S memory selection signal connecting line 132-1. The AND circuit 11s-1 outputs to the buffer 9s-1 an AND signal of the output signal from the S memory selection buffer 13-1 and the output signal from the buffer 9-1.

The storing unit block 10-2 to the storing unit block 10-n are similarly configured as the above-described storing unit block 10-1. According to the present exemplary embodiment, the solid-state imaging device may be driven at high speed by arranging each buffer in each block even when the pixel number is large and thus the number of storing units 6 is large. This is similar to the third exemplary embodiment.

Further, according to the present exemplary embodiment, the transmission of the counter pulse signal from the buffer 9-1 to the buffers 83n and 83s may be controlled by controlling the N memory selection pulse of the line 121-1 and the S memory selection pulse of the line 131-1. Power consumption may thus be reduced.

Figure 14:
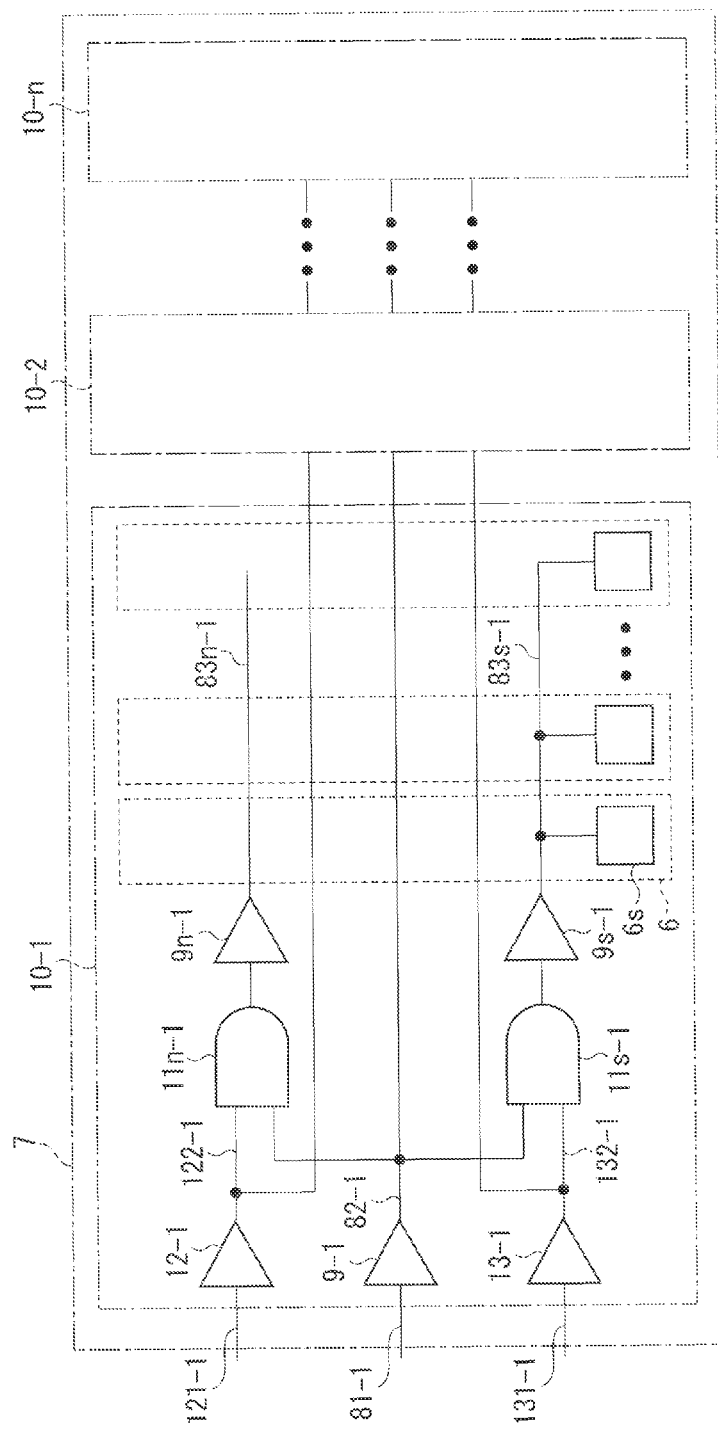
FIG. 14 illustrates a configuration example of the storing unit according to a seventh exemplary embodiment.

The seventh exemplary embodiment will be described below. FIG. 14 illustrates a configuration example of the storing section 7 in the solid-state imaging device according to the seventh exemplary embodiment. The differences between the present exemplary embodiment and the sixth exemplary embodiment will be described below.

According to the present exemplary embodiment, the resolution (i.e., the number of bits) of the A/D conversion is different between the A/D conversion of the N signal and the A/D conversion of the S signal as in the fourth exemplary embodiment (illustrated in FIG. 6). Further, the storage bit number of the first storage unit 6n is different from the storage bit number of the second storage unit 6s.

For example, it is assumed that the A/D conversion is 10 bits for the N signal and 12 bits for the S signal. Further, the storage capacity of the first storing unit 6n with respect to the count value of the N signal is 10 bits, and the storage capacity of the second storing unit 6s with respect to the count value of the S signal is 12 bits. In such a case, the counter 5 and the storing unit 6 are connected as illustrated in FIG. 13 for the first 10 bits, and as illustrated in FIG. 14 for the 11$^{th}$ bit and the 12$^{th}$ bit. Referring to FIG. 14, the first storing unit 6n is omitted from the configuration illustrated in FIG. 13. The buffer 9-1 drives the buffers 9n-1 and 9s-1 and the buffer 9-2 in the storing unit block 10-2, similarly as illustrated in FIG. 13, so that there is no difference between the propagation delays in the bits.

Figure 15:
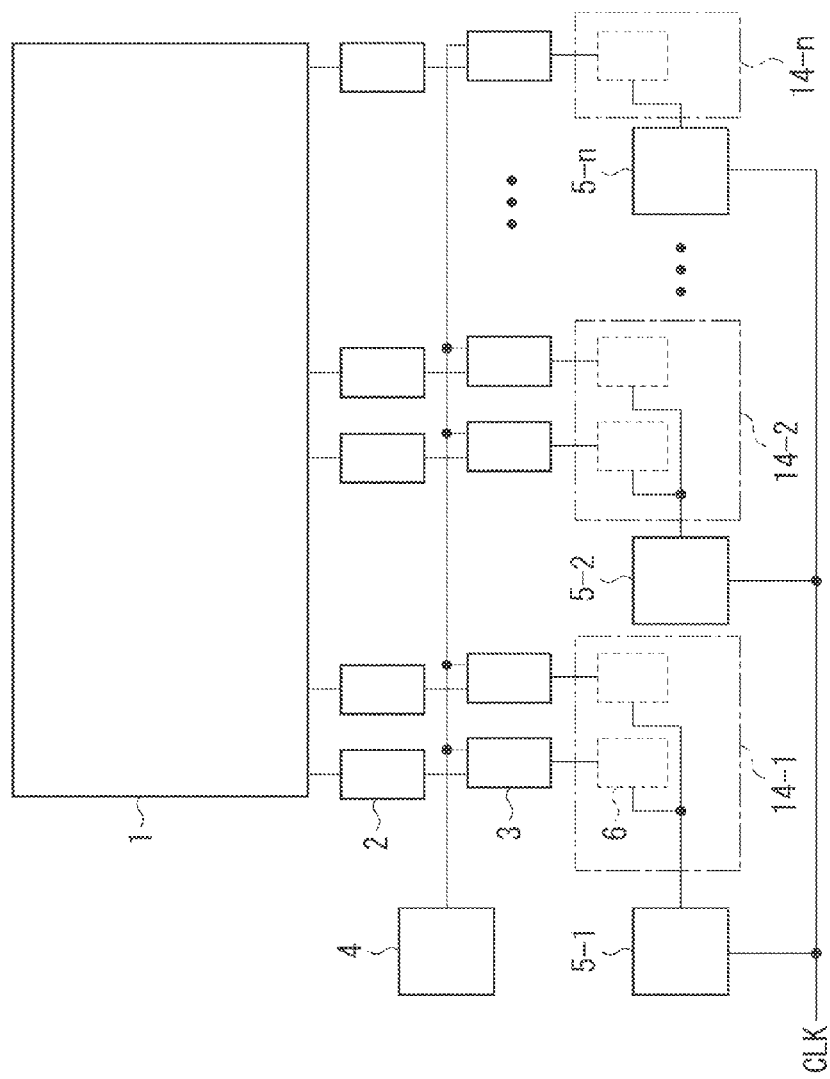
FIG. 15 illustrates a configuration example of the storing unit according to an eighth exemplary embodiment.

The eighth exemplary embodiment will be described below. FIG. 15 illustrates a configuration example of the storing section 7 in the solid-state imaging device according to the eighth exemplary embodiment.

Referring to FIG. 15, the solid-state imaging device includes a plurality of counters 5-1, 5-2, . . . , and 5-n, and a plurality of storing unit blocks 14-1, 14-2, . . . , and 14-n, which is different from the solid-state imaging device illustrated in FIG. 1. The differences between the solid-state imaging devices illustrated in FIG. 15 and in FIG. 1 will be described below. Each of the plurality of storing unit blocks 14-1, 14-2, . . . , and 14-n includes the plurality of storing units 6. A clock signal CLK is input to the plurality of counters 5-1, 5-2, . . . , and 5-n, and each of the plurality of counters 5-1, 5-2, . . . , and 5-n outputs the count pulse to the plurality of storing unit blocks 14-1, 14-2, . . . , and 14-n.

Figure 16:
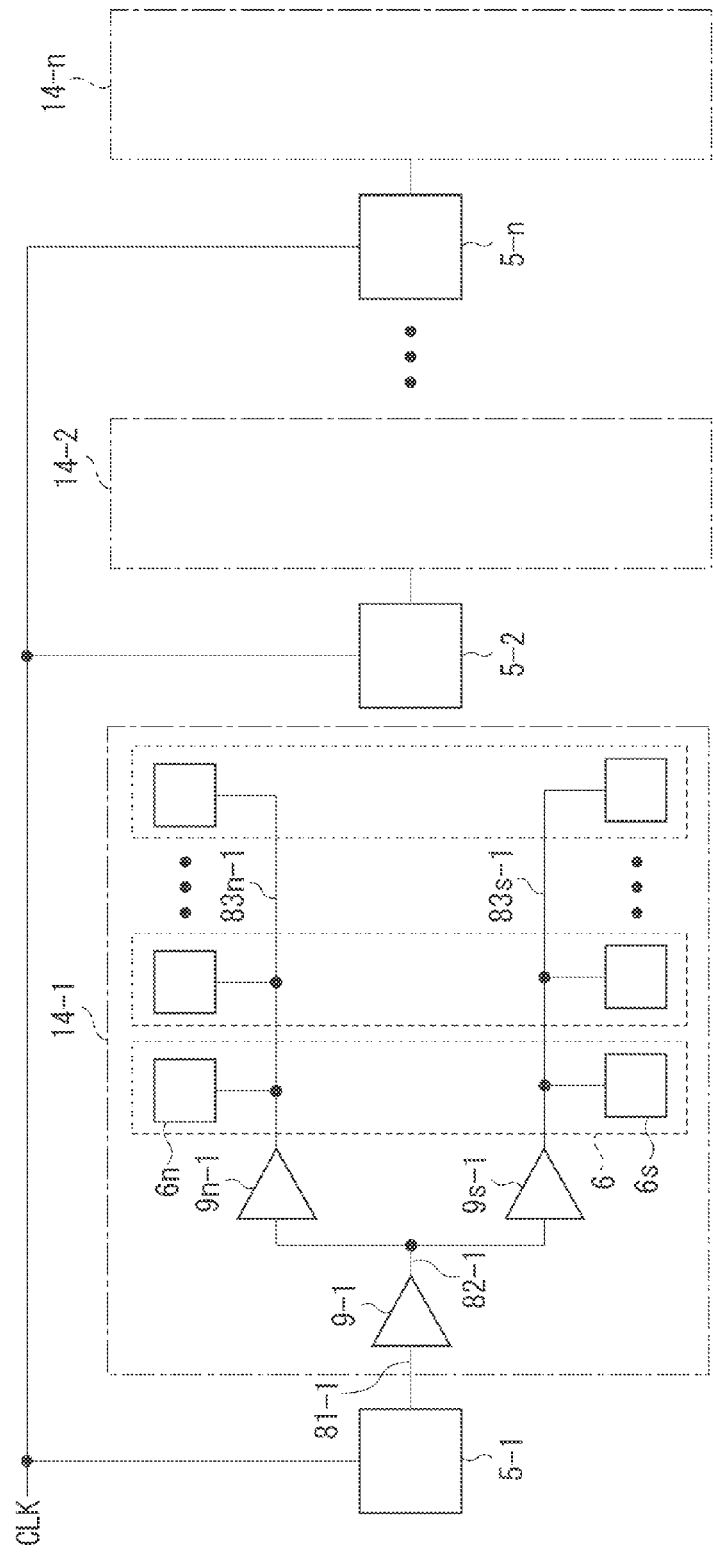
FIG. 16 illustrates an example of a storing unit block in the solid-state imaging device illustrated in FIG. 15.

FIG. 16 illustrates a configuration example of the plurality of storing unit blocks 14-1, 14-2, . . . , and 14-n illustrated in FIG. 15. Referring to FIG. 16, each of the storing unit blocks 14-1, 14-2, . . . , and 14-n is configured the same as the storing unit block 10-1 illustrated in FIG. 5. The counters 5-1, 5-2, . . . , and 5-n are mutually the same. The common clock signal CLK is supplied to the counters 5-1, 5-2, . . . and 5-n, and the counters 5-1, 5-2, . . . and 5-n output the same count value.

The count pulses from each of the plurality of counters 5-1, 5-2, . . . , and 5-n are respectively input to the plurality of buffers 9-1 via the plurality of connecting lines 81-1. The output signal from the buffer 9-1 is input to the buffers 9n-1 and 9s-1 via the connecting line 82-1. The output signals from the buffers 9n-1 and 9s-1 are respectively input to the storing units 6n and 6s via the connecting lines 83n-1 and 83s-1. The plurality of storing units 6 is divided between the plurality of storing unit blocks 14-1, 14-2, . . . , and 14-n. Each of the storing units 6 in the plurality of storing unit blocks 14-1, 14-2, . . . , and 14-n stores the count values of the plurality of counters 5-1, 5-2, . . . , and 5-n.

If there is one counter 5, a delay is generated in a storing period between the initial storing unit 6 to the last storing unit 6, and an output error is thus generated. According to the present exemplary embodiment, the plurality of counters 5-1, 5-2, ..., and 5-*n* is arranged for the plurality of storing unit blocks 14-1, 14-2, ..., and 14-*n*. As a result, the delay from the counters 5-1, 5-2, ..., and 5-*n* to the storing unit blocks 14-1, 14-2, ..., and 14-*n* may be reduced, and the output error due to the delay decreases. Further, the propagation delay of the count pulse supplied to the first storing unit 6*n* and the propagation delay of the count pulse supplied to the second storing unit 6*s* become the same even when there is the plurality of counters 5-1, 5-2, ..., and 5-*n*. The fixed noise component may thus be reduced. In other words, the propagation delays of the count pulses supplied to the first storing unit 6*n* and the second storing unit 6*s* may be caused to be the same while minimizing the propagation delays.

Figure 17:
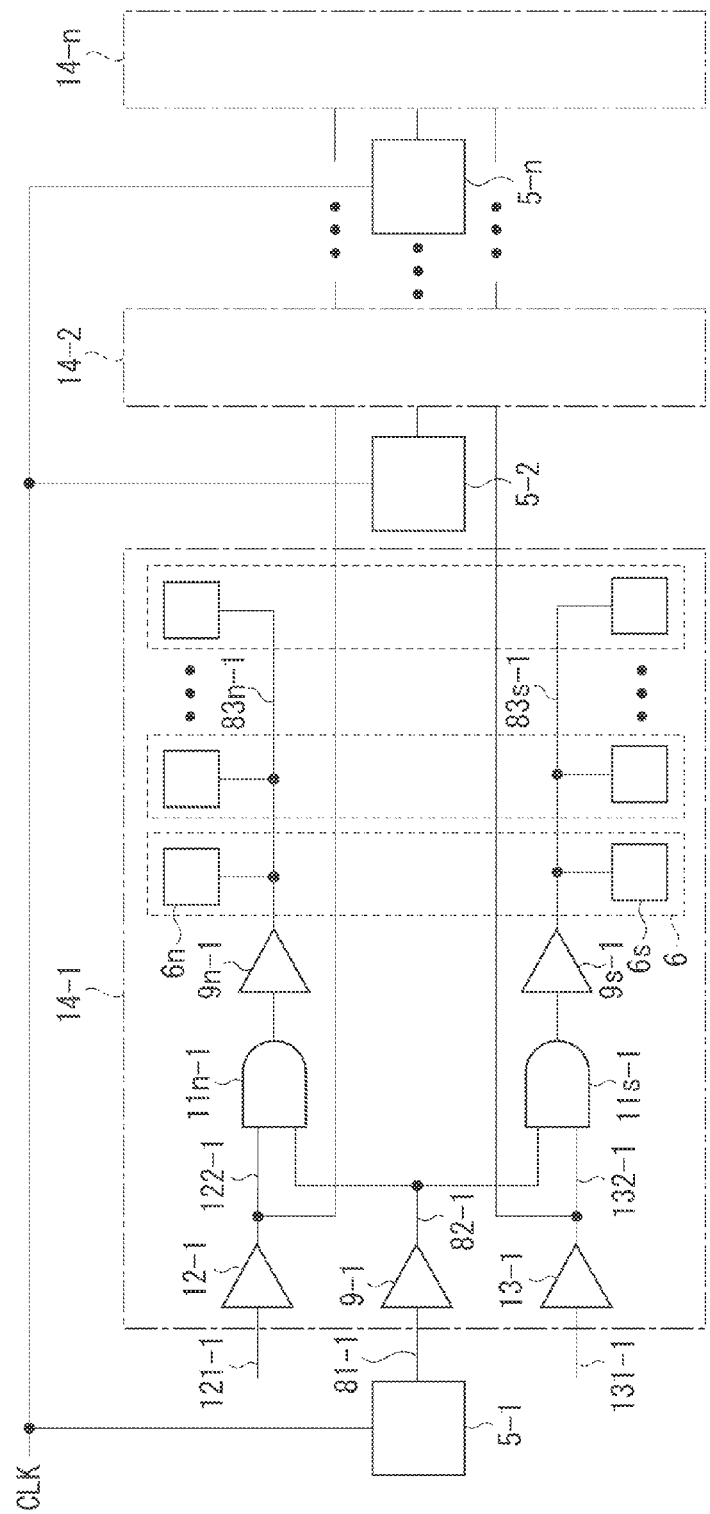
FIG. 17 illustrates an example of a storing unit block according to a ninth exemplary embodiment.

The ninth exemplary embodiment will be described below. FIG. 17 illustrates the configuration example of the storing unit blocks 14-1, 14-2, ..., and 14-*n* illustrated in FIG. 15 according to the ninth exemplary embodiment. The differences in the present exemplary embodiment from the eighth exemplary embodiment will be described below. Each of the storing unit blocks 14-1, 14-2, ..., and 14-*n* has configuration same as the storing unit block 10-1 illustrated in FIG. 13, and may reduce power consumption as described in the sixth exemplary embodiment.

Further, according to the present exemplary embodiment, the plurality of counters 5-1, 5-2, ..., and 5-*n* is arranged for the plurality of storing unit blocks 14-1, 14-2, ..., and 14-*n*, similarly as in the eighth exemplary embodiment. As a result, the delay from the counters 5-1, 5-2, ..., and 5-*n* to the storing unit blocks 14-1, 14-2, ..., and 14-*n* may be reduced, and the output error due to the delay decreases. Further, the propagation delay of the count pulse supplied to the first storing unit 6*n* and the propagation delay of the count pulse supplied to the second storing unit 6*s* become the same even when there is the plurality of counters 5-1, 5-2, ..., and 5-*n*. The fixed noise component may thus be reduced. In other words, the propagation delays of the count pulses supplied to the first storing unit 6*n* and the second storing unit 6*s* may be caused to be the same while minimizing the propagation delays.

As described above, according to the first, second, third, fourth, fifth, sixth, seventh, eighth, and ninth exemplary embodiment, the fixed noise component in each column due to the difference in the propagation delays of the count value may be reduced by including the first buffer 9*n* and the second buffer 9*s*.

While the disclosure has been described with reference to exemplary embodiments, it is to be understood that the disclosure is not limited to the disclosed exemplary embodiments. The scope of the following claims is to be accorded the broadest interpretation so as to encompass all modifications, equivalent structures, and functions.

Figure 18:
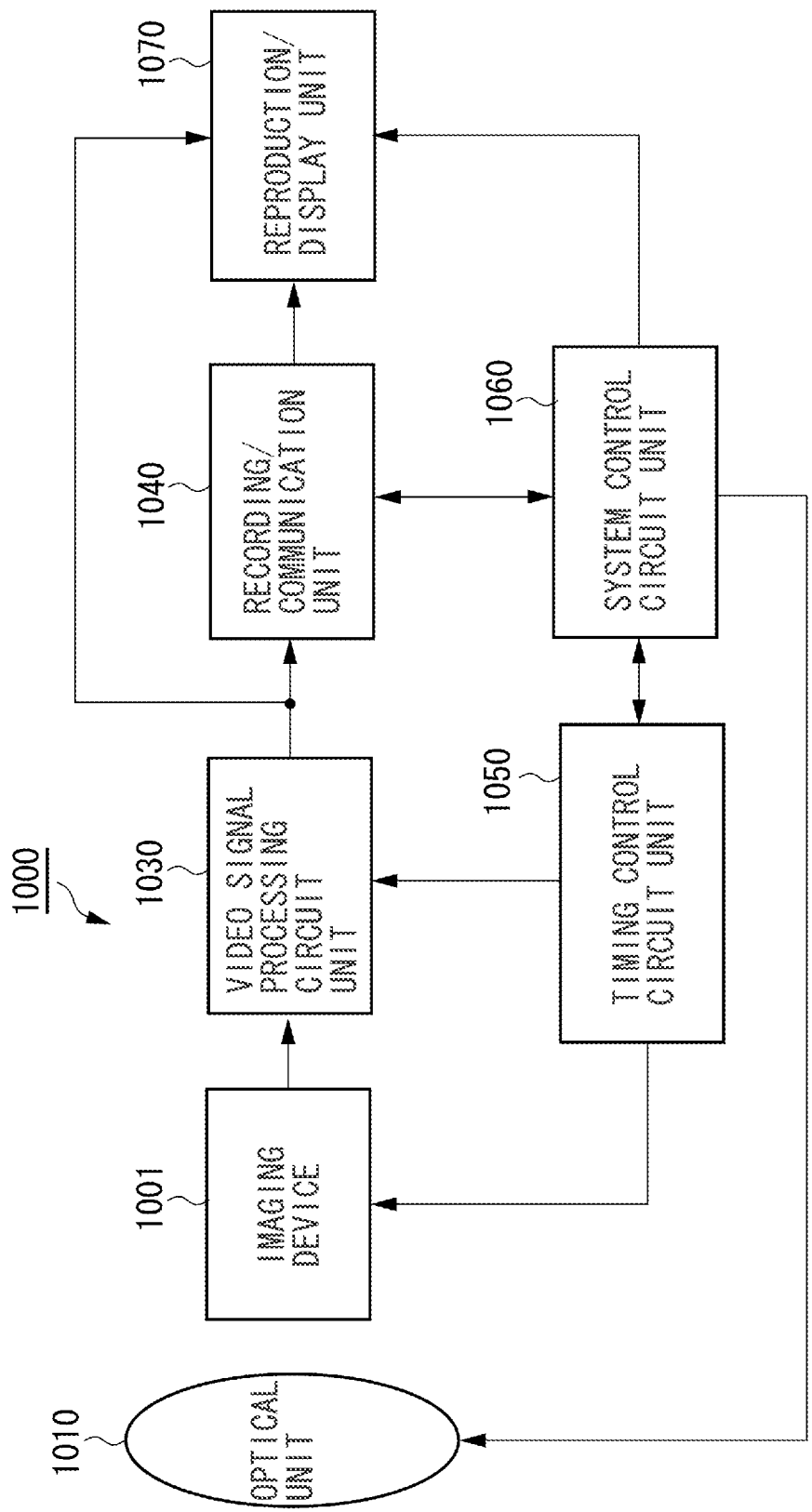
FIG. 18 is a block diagram illustrating a configuration example of an imaging system.

The tenth exemplary embodiment will be described below. An imaging system according to the present exemplary embodiment will be described below with reference to FIG. 18. Referring to FIG. 18, an imaging system 1000 includes an optical unit 1010, an imaging device 1001, a video signal processing circuit unit 1030, a recording/communication unit 1040, a timing control circuit unit 1050, a system control circuit unit 1060, and a reproduction/display unit 1070. The imaging device 1001 uses the solid-state imaging device according to the above-described exemplary embodiments.

The optical unit 1010, i.e., an optical system including the lens, focuses light from an object on the pixel array in which the plurality of pixels are arranged horizontally and vertically in the imaging device 1001. The optical unit 1010 thus forms an image of the object on the pixel array. The imaging device 1001 outputs the signal according to the light image formed on the pixel unit at the timing based on the signal from the timing control circuit unit 1050.

The signal output from the imaging device 1001 is input to the video signal processing circuit unit 1030, i.e., a video signal processing unit. The video signal processing circuit unit 1030 then processes the input electric signal, such as corrects the input electric signal, according to a method determined by a program. The processed signal is then transmitted to the recording/communication unit 1040 as the image data. The recording/communication unit 1040 transmits to the reproduction/display unit 1070 the signal for forming the image, and causes the reproduction/display unit 1070 to reproduce and display a moving image or a still image. Further, the recording/communication unit 1040 receives the signal from the video signal processing circuit unit 1030 and communicates with the system control circuit unit 1060. Furthermore, the recording/communication unit 1040 records on a recording medium (not illustrated) the signal for forming the image.

The system control circuit unit 1060 collectively controls the operations of the imaging system, and controls the driving of the optical unit 1010, the timing control circuit unit 1050, the recording/communication unit 1040, and the reproduction/display unit 1070. Further, the system control circuit unit 1060 includes a storage device (not illustrated), i.e., the recording medium, and records the programs necessary for controlling the operations of the imaging system. Furthermore, the system control circuit unit 1060 supplies within the imaging system the signal for switching a drive mode according to a user operation. More specifically, the system control circuit unit 1060 supplies the signal for changing the row to be read or reset, changing a viewing angle in response to electronic zooming, and shifting the viewing angle in response to electronic image stabilization.

The timing control circuit unit 1050 controls drive timing of the imaging device 1001 and the video signal processing circuit unit 1030 based on control performed by the system control circuit unit 1060, i.e., the control unit.

While the disclosure has been described with reference to exemplary embodiments, it is to be understood that the disclosure is not limited to the disclosed exemplary embodiments. The scope of the following claims is to be accorded the broadest interpretation so as to encompass all modifications, equivalent structures, and functions.

While the disclosure has been described with reference to exemplary embodiments, it is to be understood that the disclosure is not limited to the disclosed exemplary embodiments. The scope of the following claims is to be accorded the broadest interpretation so as to encompass all modifications, equivalent structures, and functions.

This application claims priority from Japanese Patent Applications No. 2011-223117 filed Oct. 7, 2011 and No. 2012-161780 filed Jul. 20, 2012, which are hereby incorporated by reference herein in their entirety.

What is claimed is:
1. A solid-state imaging device comprising:
a plurality of pixels arranged in a matrix, each of the plurality of pixels configured to generate a signal by photoelectric conversion;
a plurality of readout circuits provided in each column of the plurality of pixels arranged in a matrix, configured to read out for each column a signal of the plurality of pixels;
a plurality of comparison units configured to compare a signal output from the plurality of readout circuits with a reference signal whose level changes with time;

a counter configured to perform a count operation from when the level of the reference signal starts to change;

a first buffer configured to buffer a count value of the counter;

a second buffer configured to buffer a count value of the counter; and a plurality of storing units connected to the plurality of comparison units, configured to store a count value of the counter when a magnitude relation between a signal output from the plurality of the readout circuits and the reference signal is inverted, wherein each of the plurality of storing units includes a first storing unit to which an output signal from the first buffer is input, configured to store the count value of a signal output from the readout circuit when the pixel is in a reset state, and a second storing unit to which an output signal from the second buffer is input, configured to store the count value of a signal output from the readout circuit when the pixel is in a non-reset state.

2. The solid-state imaging device according to claim 1, further comprising a third buffer configured to buffer a count value of the counter, wherein the first buffer buffers an output signal from the third buffer, and wherein the second buffer buffers an output signal from the third buffer.

3. The solid-state imaging device according to claim 1, further comprising:

a first connecting line connected to an output terminal of the first buffer; and a second connecting line connected to an output terminal of the second buffer, wherein the first storing unit is connected to the first connecting line, and wherein the second storing unit is connected to the second connecting line.

4. The solid-state imaging device according to claim 3, wherein a direction in which the first storing unit is arranged with respect to the first connecting line is the same as a direction in which the second storing unit is arranged with respect to the second connecting line.

5. The solid-state imaging device according to claim 3, wherein a direction in which the first storing unit is arranged with respect to the first connecting line is opposite of a direction in which the second storing unit is arranged with respect to the second connecting line.

6. The solid-state imaging device according to claim 2, further comprising:

a fourth buffer configured to buffer an output signal from the third buffer;

a fifth buffer configured to buffer an output signal from the fourth buffer; and a sixth buffer configured to buffer an output signal from the fourth buffer, wherein output signals from the first buffer and the second buffer are respectively input to the first storing unit and the second storing unit in storing units in a portion of columns among the plurality of storing units, and wherein output signals from the fifth buffer and the sixth buffer are respectively input to the first storing unit and the second storing unit in storing units in another portion of columns among the plurality of storing units.

7. The solid-state imaging device according to claim 1, wherein a storage bit number of the first storing unit is different from a storage bit number of the second storing unit.

8. The solid-state imaging device according to claim 2, wherein a plurality of groups including the first buffer, the second buffer, and the third buffer is provided.

9. The solid-state imaging device according to claim 1, further comprising a transmission unit configured, during a period in which the first storing unit is to store the count value, to transmit a count value of the counter to the first buffer and not to the second buffer, and configured, during a period in which the second storing unit is to store the count value, to transmit a count value of the counter to the second buffer and not to the first buffer.

10. The solid-state imaging device according to claim 1, wherein the plurality of storing units is divided into a plurality of storing unit blocks, wherein a plurality of the counters is provided in the plurality of storing unit blocks, and wherein storing units in the plurality of storing unit blocks respectively store count values of the plurality of counters.

11. An imaging system comprising:

a solid-state imaging device according to claim 1;

an optical system configured to form an image on the plurality of pixels; and a video signal processing unit configured to process a signal output from the imaging device and generate image data.

* * * * *